United States Patent
Rao et al.

(10) Patent No.: US 12,380,004 B2
(45) Date of Patent: Aug. 5, 2025

(54) DYNAMIC MULTI-LANE DEGRADE CAPABILITY TO FACILITATE UNINTERRUPTED SERVICE

(71) Applicant: International Business Machines Corporation, Armonk, NY (US)

(72) Inventors: Rajat Rao, Bangalore (IN); Patrick James Meaney, Poughkeepsie, NY (US); Ashutosh Mishra, Lagrangeville, NY (US); Jason Andrew Thompson, Rochester, MN (US); Nandini Gaadam Nagaraj, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/182,598

(22) Filed: Mar. 13, 2023

(65) Prior Publication Data

US 2024/0311260 A1    Sep. 19, 2024

(51) Int. Cl.
  *G06F 11/00* (2006.01)
  *G06F 11/16* (2006.01)
  *G06F 11/18* (2006.01)

(52) U.S. Cl.
  CPC .......... *G06F 11/187* (2013.01); *G06F 11/165* (2013.01)

(58) Field of Classification Search
  CPC .. G06F 11/187; G06F 11/165; G06F 11/2247; G06F 11/2252
  See application file for complete search history.

(56) References Cited

U.S. PATENT DOCUMENTS

| | | | |
|---|---|---|---|
| 9,152,596 B2 | 10/2015 | Wagh | |
| 9,710,341 B2 | 7/2017 | Butcher | |
| 9,755,888 B2 | 9/2017 | Inoue | |
| 9,852,096 B2 | 12/2017 | Sikkink | |

(Continued)

FOREIGN PATENT DOCUMENTS

| | | | |
|---|---|---|---|
| CN | 111026698 B | 6/2022 | |
| EP | 0510822 A2 | * 10/1992 | |
| JP | 2012156731 A | 8/2012 | |

OTHER PUBLICATIONS

Ankur Goel, "Find majority elements using Bit Magic," Last Updated Jan. 9, 2023. https://www.geeksforgeeks.org/find-majority-element-using-bit-magic/ (8pgs). <Retrieved from internet on Mar. 2, 2023.

(Continued)

*Primary Examiner* — Katherine Lin
(74) *Attorney, Agent, or Firm* — James L. Olsen

(57) ABSTRACT

A computer system, computer readable storage medium, and computer-implemented method for dynamically degrading a link between multiple processing devices to facilitate uninterrupted service between the multiple processing devices. The method includes determining a number of undegraded lanes within the link. The method also includes determining, subject to the number of undegraded lanes, a first operational degrade mode for the link. The method further includes initiating a retrain of the link to a second operational degrade mode. The method also includes dynamically, subject to the first degrade mode of operation, determining one or more message packet types to transmit through the link during the link retrain, thereby facilitating uninterrupted service between the multiple processing devices.

14 Claims, 16 Drawing Sheets

(56) References Cited

U.S. PATENT DOCUMENTS

| | | |
|---|---|---|
| 11,038,748 B2 | 6/2021 | Ferrer Florit |
| 2015/0163019 A1* | 6/2015 | Birrittella ................. H04L 1/08 |
| | | 714/749 |
| 2021/0089418 A1* | 3/2021 | Das Sharma ....... G06F 11/2247 |

OTHER PUBLICATIONS

Parkes, S., Florit, A. F., GonzalezVillafranca, A., & McClements, C. (May 2018). A High Availability, High Reliability SpaceVPX System. In 27th Annual Single Event Effects (SEE) Symposium coupled with the Military and Aerospace Programmable Logic Devices (MAPLD) Workshop. See highlighted sections.

\* cited by examiner 200 (cont'd)

First Communication Cable 250

216

222

First Data Comm. Lane Group
252
258
256
Second Data Comm. Lane Group
254

251 First Cable Links
236
242

DYNAMIC MULTI-LANE DEGRADE CAPABILITY TO FACILITATE UNINTERRUPTED SERVICE

BACKGROUND

The present disclosure relates to multi-lane, multiprocessor computer systems, and, more specifically, toward degrading the capability of one or more links between multiple processing devices, dynamically, with a multi-modality to facilitate uninterrupted service between the processing devices.

Many known multiprocessor computer systems include one or more processing devices communicatively, and in some cases, operably coupled to each other through respective communication links. The plurality of processing devices are often distributed in one or more drawers, that are in some cases, are distributed in one cabinet or multiple cabinets. The communication links include respective intra-drawer links and respective cables between the drawers, where each communication link includes a plurality of communication lanes embedded therein. Each communication link includes a plurality of data communication lanes, where each data communication lane is subject to at least partial degradation, and in some cases, full degradation. Therefore, each communication link includes one or more lanes that are reserved as spares to be utilized in the event of the need to remove any in-service lanes from service, thereby facilitating preservation of the available bandwidth for the respective communication links.

SUMMARY

A system, medium, and method are provided for dynamically degrading links between multiple processing devices to facilitate uninterrupted service between the processing devices.

In one aspect, a computer system for dynamically degrading a link between multiple processing devices to facilitate uninterrupted service between the processing devices is presented. The system includes a first node including a first plurality of processing devices and a second node including a second plurality of processing devices. The system also includes a link communicatively coupling the first node to the second node. The link includes a plurality of lanes. The system further includes a link retrain control module operably coupled to the link. The link retrain control module is configured to determine a number of undegraded lanes of the plurality of lanes within the link. The link retrain control module is also configured to determine, subject to the number of undegraded lanes of the plurality of lanes, a first operational degrade mode for the link. The link retrain control module is further configured to initiate a retrain of the link to a second operational degrade mode. The link retrain control module is also configured to dynamically, subject to the first degrade mode of operation, determine one or more message packet types to transmit through the link during the link retrain, thereby facilitating uninterrupted service between the multiple processing devices.

In another aspect, a computer readable storage medium is presented. The computer readable storage medium includes computer executable instructions that when executed by at least one computing device dynamically degrade a link between multiple processing devices to facilitate uninterrupted service between the multiple processing devices. The computer readable storage medium includes instructions to determine a number of undegraded lanes within the link. The computer readable storage medium also includes instructions to determine, subject to the number of undegraded lanes, a first operational degrade mode for the link. The computer readable storage medium further includes instructions to initiate a retrain of the link to a second operational degrade mode. The computer readable storage medium also includes instructions to dynamically, subject to the first degrade mode of operation, determine one or more message packet types to transmit through the link during the link retrain, thereby facilitating uninterrupted service between the multiple processing devices.

In yet another aspect, a computer-implemented method for dynamically degrading a link between multiple processing devices to facilitate uninterrupted service between the processing devices is presented. The method includes determining a number of undegraded lanes within the link. The method also includes determining, subject to the number of undegraded lanes, a first operational degrade mode for the link. The method further includes initiating a retrain of the link to a second operational degrade mode. The method also includes dynamically, subject to the first degrade mode of operation, determining one or more message packet types to transmit through the link during the link retrain, thereby facilitating uninterrupted service between the multiple processing devices.

The present Summary is not intended to illustrate each aspect of every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
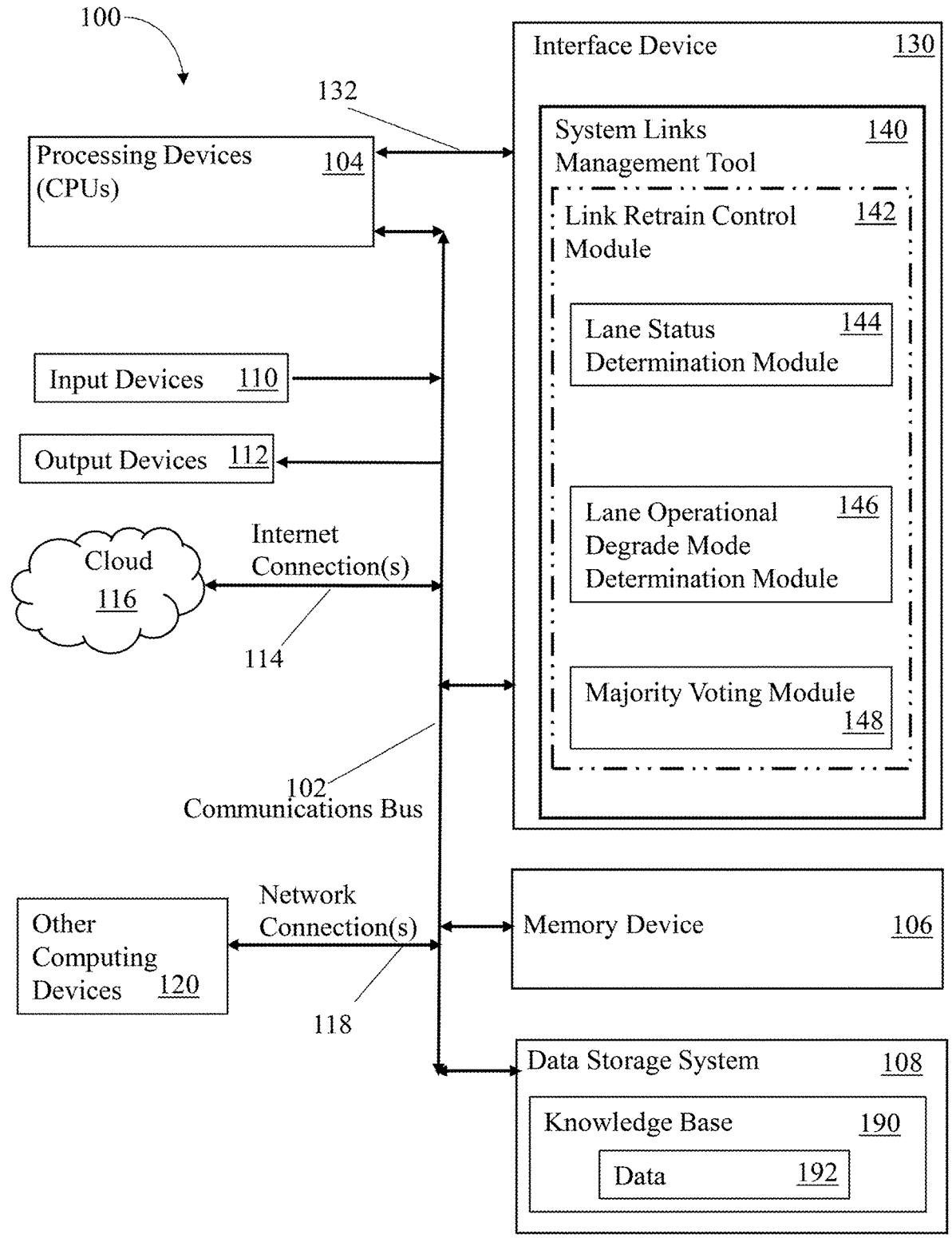
FIG. 1 is a block diagram illustrating a computer system configured to execute operation associated with dynamically degrading links between multiple processing devices to facilitate uninterrupted service between the processing devices, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to implementing a system, medium, and method for dynamically degrading links between multiple processing devices to facilitate uninterrupted service between the processing devices. While the present disclosure is not necessarily limited to such applications, various aspects of the disclosure may be appreciated through a discussion of various examples using this context.

It will be readily understood that the components of the present embodiments, as generally described and illustrated in the Figures herein, may be arranged and designed in a wide variety of different configurations. Thus, the following detailed description of the embodiments of the apparatus, system, method, and computer readable storage medium of the present embodiments, as presented in the Figures, is not intended to limit the scope of the embodiments, as claimed, but is merely representative of selected embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

As used herein, "facilitating" an action includes performing the action, making the action easier, helping to carry the action out, or causing the action to be performed. Thus, by way of example and not limitation, instructions executing on one processor might facilitate an action carried out by semiconductor processing equipment, by sending appropriate data or commands to cause or aid the action to be performed. Where an actor facilitates an action by other than performing the action, the action is nevertheless performed by some entity or combination of entities.

Many known multiprocessor computer systems include one or more processing devices communicatively, and in some cases, operably coupled to each other through respective communication links. The plurality of processing devices are often distributed in one or more drawers, and in some cases, are distributed in one cabinet or multiple cabinets. The communication links include respective intra-drawer links and respective cables between the drawers, where each communication link includes a plurality of communication lanes embedded therein. Each communication link includes a terminus at the respective processing devices, where a node is defined for one or more of the respective processing devices in a respective drawer (or cabinet). Each communication link includes a plurality of data communication lanes, where each data communication lane is subject to at least partial degradation, and in some cases, full degradation. Therefore, each communication link includes one or more lanes that are reserved as spares to be utilized in the event of the need to remove any in-service lanes from service, thereby facilitating preservation of the available bandwidth for the respective communication links.

In at least some of these known multiprocessor computer systems, there are some indications that a lane is experiencing technical circumstances that indicate degrading of the lane with respect to its ability to transmit communication traffic. Many known systems require that both nodes degrade to the same level. However, such determination that a particular data communication lane is degraded includes a link retrain that requires independent inputs from each of the two respective nodes associated with the lane. Moreover, the identification input from the two nodes is not instantaneous, and during the link retrain activities encompassing both nodes, the data communication lanes are not in operational service and the link is therefore incapable of handling any functional communication traffic. In consequence of the interrupted service between the nodes, the finite period of time (usually measured in either milliseconds or microseconds) required for the two nodes to jointly define a degraded condition of the data communication lane is sufficient to increase a potential for losing latency critical information, e.g., time-of-day (ToD) information that facilitates synchronizing the time across the two nodes, where lack of such temporal synchronization may jeopardize proper execution of the associated operations. Therefore, while the critical information is typically transmitted across all available lanes to ensure their receipt such that even if a cable is degraded in its entirety, the link retrain activities require that both nodes temporarily suspend communications operation until the retrain is completed, thereby potentially jeopardizing the transmission of the critical message packets. Typically, there are no installed mechanisms to facilitate critical message transmission during retrains due to the complexity of such mechanisms.

The aforementioned spare lanes provide at least a portion of the replacement communication paths to ensure continuity of service for communicating the critical information once the retrain activities are completed. However, as the system ages, additional lanes are degraded to the point of being unusable, and eventually all of the spare lanes have been placed into service. Further degrading of the remaining lanes reduces the overall bandwidth of the affected links. Further degrading of the remaining lanes in the link eventually reduce the remaining bandwidth to a level not sufficient to support any further operations, including transmission of the critical information, thereby removing at least a portion of the multiprocessor computer systems, at least until the associated cables are replaced. Alternatively, for example, for the ToD information, complicated mechanisms to maintain temporal synchronization between the two affected nodes may be implemented including, without limitation, more robust (and more expensive) lane construction. Accordingly, at least some of the known multiprocessor computer systems do not implement any sort of reliability mechanisms to allow critical traffic to pass through during the portions of the lifetime of the link where a significant portion of the lanes within the cables are degraded.

Referring to FIG. 1, a block diagram is presented illustrating a computer system, i.e., a multiprocessor computer system 100 (herein referred to as "the system 100") configured to execute operations associated with dynamically degrading links (not shown in FIG. 1) between multiple processing devices (only one shown in FIG. 1, with multiple processing devices configurations shown and described further herein) to facilitate uninterrupted service between the processing devices 104, in accordance with some embodiments of the present disclosure. The system 100 includes the one or more processing devices 104 (only one shown) communicatively and operably coupled to one or more memory devices 106 (only one shown) through a communications bus 102, and in some embodiments, through a memory bus (not shown). In some embodiments, each processing device 104 is a multicore processing device. The system 100 also includes a data storage system 108 that is communicatively coupled to the processing device 104 and memory device 106 through the communications bus 102. In at least some embodiments, the data storage system 108 provides storage to, and without limitation, a knowledge base 190 that includes at least a portion of the data 192 to enable operation of the system 100 as described further herein.

The system 100 further includes one or more input devices 110 and one or more output devices 112 communicatively coupled to the communications bus 102. In addition, the system 100 includes one or more Internet connections 114 (only one shown) communicatively coupled to the cloud 116 through the communications bus 102, and one or more network connections 118 (only one shown) communicatively coupled to one or more other computing devices 120 through the communications bus 102. In some embodiments, the Internet connections 114 facilitate communication between the system 100 and one or more cloud-based centralized systems and/or services (not shown in FIG. 1). In at least some embodiments, the system 100 is a portion of a cloud computing environment (see FIG. 11), e.g., and without limitation, the system 100 is a computer system/server that may be used as a portion of a cloud-based systems and communications environment through the cloud 116 and the Internet connections 114.

In one or more embodiments, the system 100 includes an interface device 130 communicatively coupled to the communications bus 102. In addition, the interface device 130 is communicatively and operably coupled to the processing devices 104 through an interface bus 132. In one or more embodiments, the interface device 130 is at least partially resident within the memory device 106. In some embodiments, the interface device 130 is fully resident within the memory device 106.

The interface device 130 is discussed in detail further in this disclosure in conjunction with the plurality of processing devices 104. The interface device 130 is configured to execute, with full or partial automation, tasks that include, without limitation, substantially all of the system links management activities. Such management includes, without limitation, link retrain activities that include determining the data communication lanes' status, degrading of the data communication lanes, majority voting control, receiver control, and transmitter control (sometimes referred to as "driver control").

In at least some embodiments, the interface device 130 is configured to run continuously in the background to automatically execute the processes associated with the communications between the processing devices 104. In some embodiments, the interface device 130 is directly engaged for specific tasking by the users thereof, e.g., and without limitation, manual execution commands.

In one or more embodiments, the interface device 130 includes a system links management tool 140 that is configured to manage substantially all of intercommunications between the plurality of processing devices' 104. For example, and without limitation, some embodiments include a link retrain control module 142 that is configured to execute substantially all of the activities associated with retraining the links after a link repair or a cable replacement. Retraining of the links is discussed further herein. Accordingly, the modules embedded within the link retrain control module 142 including, without limitation, in some embodiments, a lane status determination module 144, a lane operational degrade mode determination module 146, and a majority voting module 148, are discussed in conjunction with the link retrain features and activities. In some embodiments, portions of the system links management tool 140 are resident in the memory device 106.

Further, in some embodiments, the data storage system 108 is configured to maintain a knowledge base 190 that includes any data 192 the interface device 130 needs for proper execution of the interface communications between the plurality of processing devices 104. The data storage system 108 is also configured to store the data 192 collected during the execution of the interface communications between the plurality of processing devices 104.

Figure 2A:
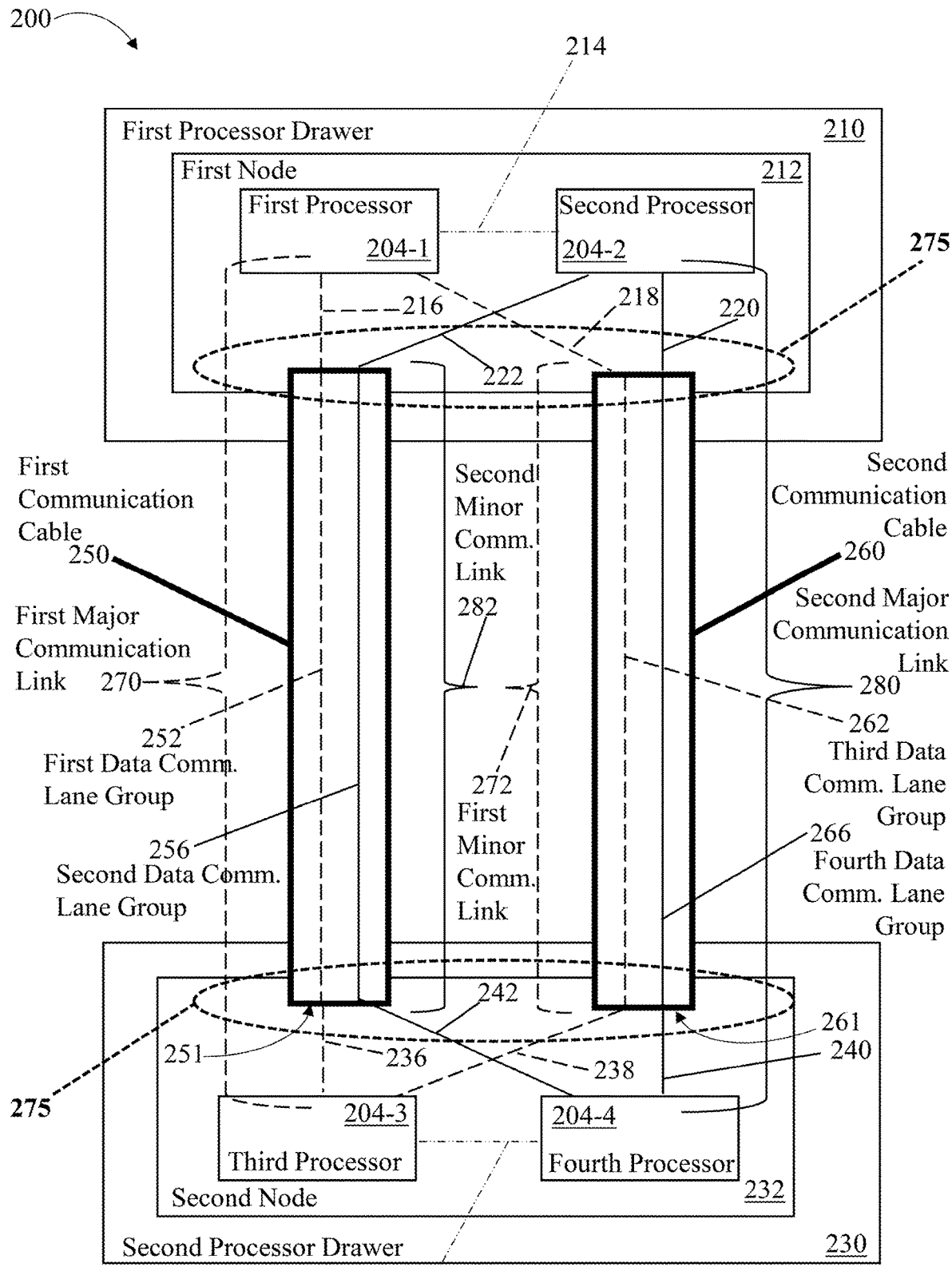
FIG. 2A is a block diagram illustrating an intercommunication scheme for at least a portion of the computer system shown in FIG. 1, according to one or more embodiments of the present disclosure.

Referring to FIG. 2A, a block diagram is presented illustrating an intercommunication scheme 200 (herein referred to as "the scheme 200") for at least a portion of the system 100 (shown in FIG. 1) is presented, according to one or more embodiments of the present disclosure. The scheme 200 includes a plurality of processing devices (collectively referred to as the processing devices 204) including processing devices 204-1, 204-2, 204-3, and 204-4, where the processing devices 204 are shown as one or more processing devices 104 in FIG. 1. Accordingly, in at least some embodiments, the scheme 200 at least partially defines the multiprocessor computer system 100.

In some embodiments, the scheme 200 includes a first processor drawer 210 that is operably and communicatively coupled, i.e., interconnected to a second processor drawer 230, where the number of two processor drawers as shown in FIG. 2A is non-limiting. The first processing drawer 210 includes the processing devices 204-1 and 204-2, where, in some embodiments, the processing devices 204-1 and 204-2 are processing chips, such as a first central processor and a second central processor, respectively. Similarly, the second processing drawer 230 includes the processing devices 204-3 and 204-4, where, in some embodiments, the processing devices 204-3 and 204-4 are processing chips, such as a third central processor and a fourth central processor, respectively. In some embodiments, each pair of processing devices 204-1 and 204-2, and 204-3 and 202-4, are logically grouped and/or physically connected within a first cluster, i.e., a first node 212 and a second cluster, i.e., a second node 232, respectively, where two processing devices-per-cluster as shown in FIG. 2 is non-limiting. Both of the processor drawers 210 and 230 include signal transmission features (i.e., transmitters) and signal receiving features (i.e., receivers) (neither shown).

In at least some embodiments, the scheme 200 includes a plurality of communication cables that facilitate interconnecting the first processor drawer 210 and the second processor drawer 230. More specifically, the scheme 200 includes a first communication cable 250 and a second communication cable 260 (both described further herein).

In some embodiments, the scheme 200 also includes one or more internal communication mechanisms embedded within the processing drawers 210 and 230. Such internal communication mechanisms include, without limitation, any combination of internal communication busses, interfaces, any electronic components and logic to adapt or convert received signals of one protocol and output corresponding signals of another protocol, etc., that conform to the respective industry specifications and may be electrical, optical, or the like, where signals are efficiently communicated between the respective components. For example, specifically, in some embodiments, the first processing device 204-1 is interconnected with the second processing device 204-2 through any communication mechanisms 214 that enable operation of the scheme 200 as described herein. Similarly, in some embodiments, the third processing device 204-3 is interconnected with the fourth processing device 204-4 through any communication mechanisms 234 that enable operation of the scheme 200 as described herein.

In addition, in some embodiments, the first processing drawer 210 includes a first major communication mechanism 216 and a first minor communication mechanism 218 (both shown as dashed lines), where the terms "major" and "minor" are described further herein. The first major communication mechanism 216 extends between the first processing device 204-1 and the first communication cable 250. The first minor communication mechanism 218 extends between the first processing device 204-1 and the second communication cable 260. Also, the processing drawer 210 includes a second major communication mechanism 220 and a second minor communication mechanism 222 (both shown as solid lines). The second major communication mechanism 220 extends between the second processing device 204-2 and the second communication cable 260. The second minor communication mechanism 222 extends between the second processing device 204-2 and the first communication cable 250.

Furthermore, in some embodiments, the second processing drawer 230 includes a third major communication mechanism 236 and a third minor communication mechanism 238 (both shown as dashed lines). The third major communication mechanism 236 extends between the third processing device 204-3 and the first communication cable 250. The third minor communication mechanism 238 extends between the third processing device 204-3 and the second communication cable 260. Also, the processing drawer 210 includes a fourth major communication mechanism 240 and a fourth minor communication mechanism 242 (both shown as solid lines). The fourth major communication mechanism 240 extends between the fourth processing device 204-4 and the second communication cable 250. The fourth minor communication mechanism 242 extends between the third processing device 204-3 and the second communication cable 260.

In some embodiments, at least some of the first, second, third, and fourth major communication mechanisms 216, 220, 236, and 240, and the first, second, third, and fourth minor communication mechanisms 218, 222, 238, and 242 include a chip-side-interface (not shown) that communicatively connects the respective communication mechanism with the respective processing device 204, and also include a cable-side-interface (e.g., and without limitation, an adaptor) that communicatively connects the respective communication mechanism with the respective communication cable 250 and 260.

In at least some embodiments, the scheme 200 includes a plurality of communication links that facilitate interconnecting the first processor drawer 210 and the second processor drawer 230. More specifically, the scheme 200 includes a first major communication link 270 that interconnects the processing device 204-1 with the processing device 204-3 (as shown with the dashed lines), and a second major communication link 280 that interconnects the processing device 204-2 with the processing device 204-4 (as shown by the solid lines). The scheme 200 further includes a first minor communication link 272 that also interconnects the processing device 204-1 with the processing device 204-3 (as shown with the dashed lines), and a second minor communication link 282 that interconnects the processing device 204-2 with the processing device 204-4 (as shown by the solid lines).

Figure 2B:
FIG. 2B is a cutaway block diagram illustrating a first communication cable of the intercommunication scheme shown in FIG. 2A, according to one or more embodiments of the present disclosure.
Figure 2B:
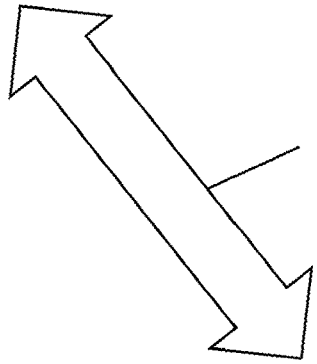
Figure 2B:
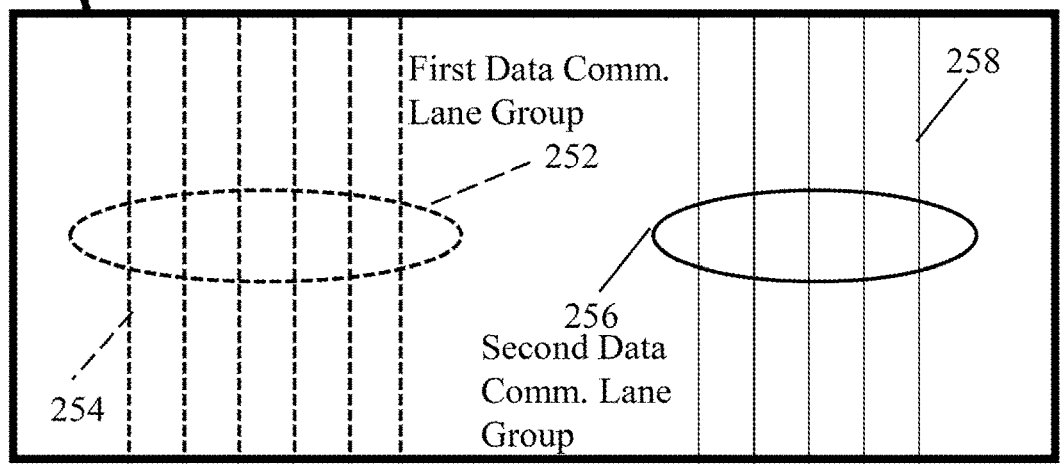
Figure 2B:
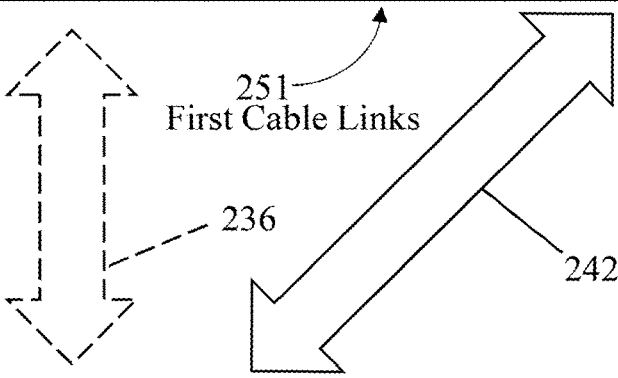

Referring to FIG. 2B, a cutaway block diagram is presented illustrating the communication cable 250 of the intercommunication scheme 200 shown in FIG. 2A, according to one or more embodiments of the present disclosure. The communication cable 250 is shown with reference to the first major communication mechanism 216, the second major communication mechanism 236, the second minor communication mechanism 222, and the fourth minor communication mechanism 242. The communication cable 250 includes a first data communication lane group 252 (herein referred to as the first data lane group 252) (sometimes referred to as "the first cable link 252") that includes six data lanes 254 (only one labeled), and a second data communication lane group 256 (herein referred to as the second data lane group 256) (sometimes referred to as "the second cable link 256") that includes five lanes 258 (only one labeled), where the values of 6 and 5, respectively, are non-limiting. The first data lane group 252 is a major data lane group in that it includes more data lanes than the second data lane group 256, that is therefore a minor data lane group. Therefore, as used herein, the term "major" indicates a greater number of data lanes than a "minor" data lane group. Accordingly, as shown herein, the dashed lines and arrows indicate a major data lane group of six lanes and the solid lines and arrows indicate a minor data lane group of five lanes.

As used herein, a "data lane" and a "data communication lane" are defined herein to be one or more of electrical, optical, etc. transmission media in which data signals are efficiently transferred. One data lane may transmit a particular data signal, at any one time. For example, one data lane may transmit a "low" data signal at a first-time instance, and may transmit a "high" data signal at a second-time instance. In some embodiments, a "data lane" is implemented as a "single ended" wire or transmission medium. In some embodiments, a "data lane" is implemented using a pair of differential wires, or nets or connections in a true-compliment configuration. For instance, a logical "zero" on one data lane may be depicted as a "low" on a first differential wire of the pair and a "high" on a second differential wire of the pair. Likewise, a logical "one" may be depicted as a "high" on a first differential wire of the pair and a "low" on a second differential wire of the pair. Data lanes within the same data lane group may each transmit independent data signal(s), relative to the other data lanes within the same data lane group. In other words, for example, the data signal transmitted by a first data lane 254 within the first data lane group 252 could, but need not necessarily be influenced by a second data lane 254 within the first data lane group 252.

As further used herein, the data lanes 254 and 258 (as well as additional data lanes identified and described in the present disclosure) are a portion of a differential wire configuration; therefore, each data lane 254 and 258 include two wires; however, for clarity, the data lanes 254 and 258 are depicted as one wire. In addition, the wires are not bidirectional; therefore, the bidirectional nature of the devices shown and described herein is enabled through two lanes for every one lane shown. As such, each processing device 204 is communicatively coupled to the remainder of the scheme 200 through a transmitting data lane (two differential wires) and a receiving data lane (two differential wires), for a total of four wires being represented by each illustrated data lane 254 and 258.

Figure 2C:
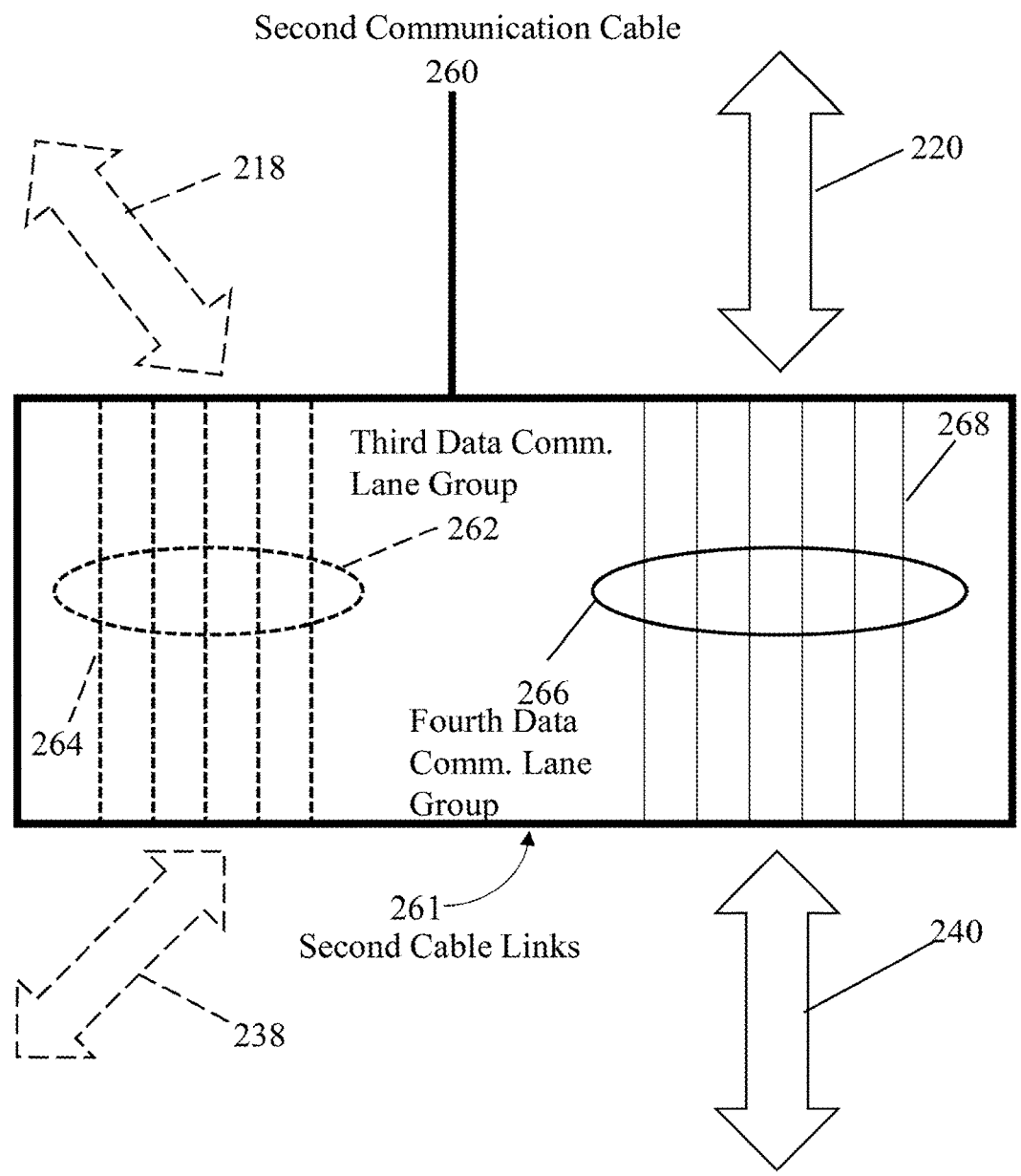
FIG. 2C is a cutaway block diagram of a second communication cable of the intercommunication scheme shown in FIG. 2A, according to one or more embodiments of the present disclosure.

Referring to FIG. 2C, a cutaway block diagram is presented illustrating the communication cable 260 of the intercommunication scheme 200 shown in FIG. 2A, according to one or more embodiments of the present disclosure. The communication cable 260 is shown with reference to the first minor communication mechanism 218, the third minor communication mechanism 238, the second major communication mechanism 220, and the fourth major communication mechanism 240. The communication cable 260 includes a third data communication lane group 262 (herein referred to as the third data lane group 262) (sometimes referred to as "the third cable link 262") that includes five data lanes 264 (only one labeled), and a fourth data communication lane group 266 (herein referred to as the fourth data lane group 256) (sometimes referred to as "the fourth cable link 266") that includes six data lanes 268 (only one labeled), where the values of 6 and 5, respectively, are non-limiting. The fourth data lane group 266 is a major data lane group and the third data lane group 262 is a minor data lane group.

Referring again to FIG. 2A, in some embodiments, the first major communication link 270 between the first processing device 204-01 in the first processing drawer 210 and the third processing device in the second processing drawer 230 includes the first major communication mechanism 216, the first communication cable 250, and the third major communication mechanism 236. In some embodiments, the first major communication link 270 is referred to as "the first primary communication link 270."

Also in some embodiments, the first minor communication link 272 between the first processing device 204-01 in the first processing drawer 210 and the third processing device in the second processing drawer 230 includes the first minor communication mechanism 218, the second communication cable 260, and third minor communication mechanism 238. In some embodiments, the first minor communication link 272 is referred to as "the first secondary communication link 272."

Further, in some embodiments, the second major communication link 280 between the second processing device 204-02 in the first processing drawer 210 and the fourth processing device 240-4 in the second processing drawer 230 includes the second major communication mechanism 220, the second communication cable 260, and the fourth major communication mechanism 240. In some embodiments, the second major communication link 280 is referred to as "the second primary communication link 280."

Moreover, in some embodiments, the second minor communication link 282 between the second processing device 204-02 in the first processing drawer 210 and the fourth processing device 240-4 in the second processing drawer 230 includes the second minor communication mechanism 222, the first communication cable 250, and the fourth minor communication mechanism 242. In some embodiments, the second minor communication link 282 is referred to as "the second secondary communication link 282."

In one or more embodiments, the cables 250 and 260 and the plurality of data lanes therein are collectively identified as first cable links 251 and second cable links 261, respectively. In some embodiments, the scheme 200 includes provisions for the cables 250 and 260 (and the respective cable links 251 and 261) to be replaced while the system 100 is in service in the event that the number of operable lanes reaches a predetermined minimum threshold (as discussed further herein). When the cable links 251 and 261 are providing normal or anticipated operational data signal transfer to the associated processing devices 204, they are operating in a fully operational (FO) state when all the data lanes 254, 258, 264, and 268 within the respective cable links 251 and 261 are fully operational. Similarly, in some embodiments, the cable links 251 and 261 are operating in a partial operational (PO) state when less than all of the data lanes 254, 258, 264, and 268 within the respective cable links 251 and 261, but greater than or equal to the predetermined minimum threshold are fully operational.

In at least some embodiments, when, for example, the first communication cable 250 is replaced, the second communication cable 260 is used to maintain communications between the processors 204-1 and 204-2 in the first node 212 and the processors 204-3 and 204-4 in the second node 232. Once the cable 250 is removed from service, the four processors 204-1, 2, 3, and 4 will sense the missing cable 250. Specifically, the six lanes 254 of the first data communication lane group 252 associated with the first major communication link 270 will be determined as unavailable by the processors 204-1 and 204-3. Similarly, the five lanes 258 of the second data communication group associated with the second minor communication link 282 will be determined unavailable by the processors 204-23 and 204-4.

In some embodiments, the collective aggregation of the first major communication link 270, the first minor communication link 272, the second major communication link 280, and the second minor communication link 282 is referred to as the link 275, where the link 275 is shown in FIG. 2A proximate to both terminuses.

Figure 3:
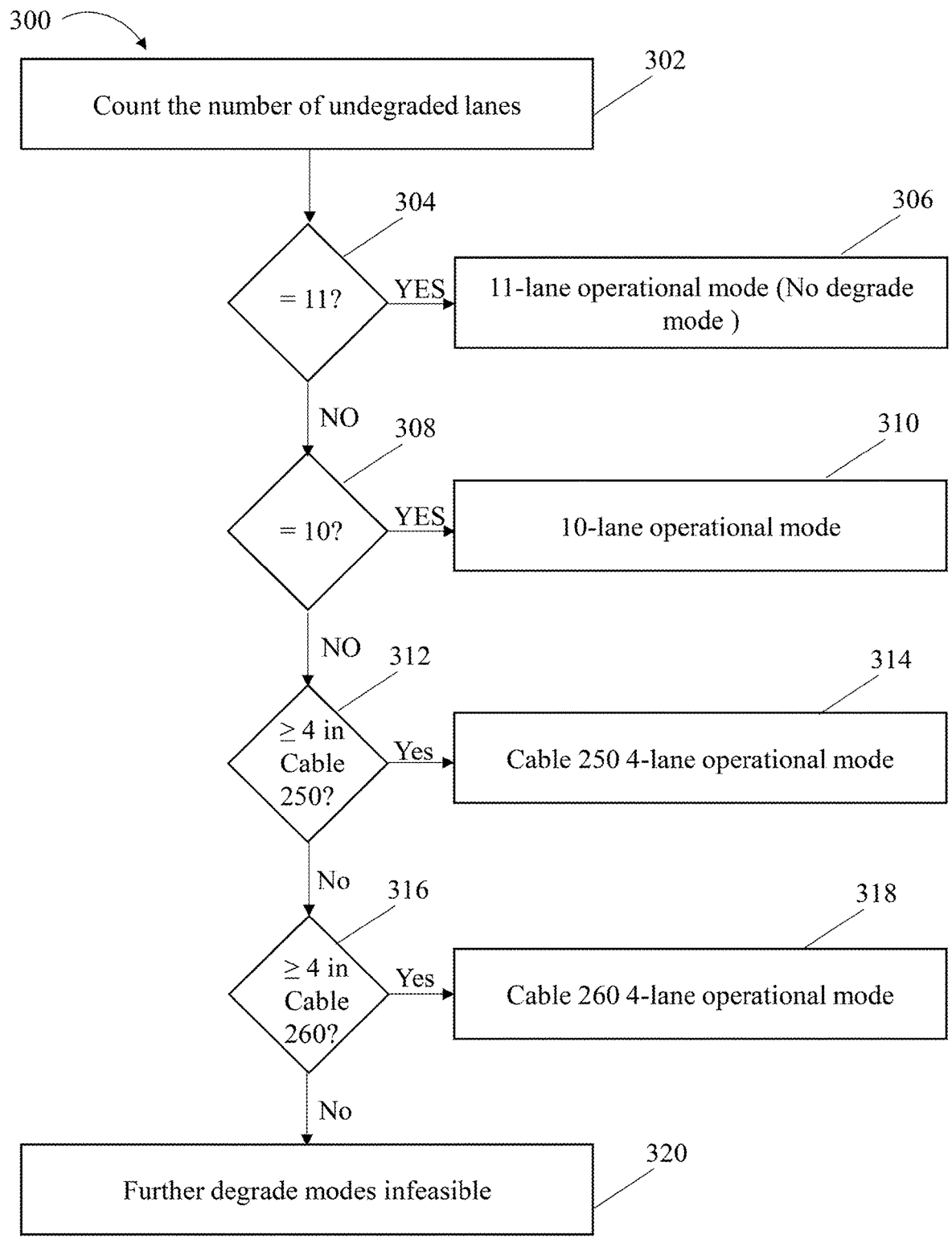
FIG. 3 is a flowchart illustrating a process of determining the operational mode of the intercommunication scheme shown in FIGS. 2A-2C, according to one or more embodiments of the present disclosure.

Referring to FIG. 3, a flowchart is presented illustrating a process 300 of determining the operational mode of the intercommunication scheme shown in FIGS. 2A-2C, according to one or more embodiments of the present disclosure. More specifically, and referring to the FIGS. 2A-2C, the process 300 is configured to provide the mechanisms to facilitate determining and setting the operational degrade mode associated with the lanes 254, 256, 264, and 266 and cables 250 and 260 of the intercommunication scheme 200. In some embodiments, the status of the lanes is determined through the lane status determination module 144 (shown in FIG. 1). As described above, the number of cables (2 herein) and the number of lanes per cable (11 herein) are any values that enable operation of the system 100 and the scheme 200 as described herein. In general, as the lanes are shifted to a degraded mode, the fewer operational lanes provide for a lower bandwidth in the affected link, and the links are therefore degraded.

In at least some embodiments, the process 300 includes counting 302 the number of undegraded lanes in the scheme 200. The mechanisms for determining if any lanes are degraded or not are discussed further with respect to FIG. 4 herein. The process 300 also includes a determination 304 as to if the number of undegraded lanes 254, 256, 264, and 266 in each of the cables 250 and 260 is equal to 11 undegraded lanes. If the response to the determination 304 is "YES," the determination 304 includes the two cables 250 and 260 are both in an 11-lane operational mode 306, i.e., they are not in a lane operational degrade mode. The lack of any degraded lanes results in the use of all 11 lanes in one of, or each of, the cables 250 and 260 and the respective logical bus will include an input from each of the lanes with respect to the type of information to be transmitted in a majority voting scheme (see FIG. 6B), i.e., 11 inputs of $L_0, L_1, L_2 \ldots L_{10}$ are provided.

Otherwise, if the response to the determination 304 is "NO," i.e., at least one of the two cables 250 and 260 has at least one degraded lane, the process 300 proceeds to a determination 308 as to whether one of the two cables 250 and 260 include a degraded lane, i.e., does any of the two cables 250 and 260 include 1 degraded lane and 10 undegraded lanes? If the result of the determination 308 is "YES," the respective cable(s) 250 and 260 are designated as 10-lane operational mode 310. The presence of a single bad (degraded) lane in one of the cables 250 and 260 will be indicative of either a single bad lane in one direction or a single bad lane in each direction. The 10 inputs to the respective logical bus for the majority voting scheme are $L_0, L_1, L_2 \ldots L_9$ are provided.

Otherwise, if the response to the determination 308 is "NO," i.e., at least one of the two cables 250 and 260 does not have merely a single degraded lane, the process 300 proceeds to a determination as to whether one of the two cables 250 and 260 include more than one degraded lane. In particular, in some embodiments, the determination 312 includes asking if the cable 250 includes at least 4 undegraded lanes. The jump from 10 lanes in the determination 308 to 4 lanes in determination 312 is to prevent unnecessary resources being directed toward a lane-by-lane countdown, and where the numerical value of "4" is described further herein. However, in some embodiments, a lane-by-lane set of determinations is executed. In some embodiments, one or more intermediate degraded lane count determinations are made. If the results of the determination 312 is "YES," there are at least four undegraded lanes in the cable 250, and then the result is the cable 250 is designated as 4-lane operational mode 314, where such designation is understood to mean that 4 or more lanes are fully operational and that less than 7 lanes are degraded in the cable 250.

Similarly, if the results of the determination 312 are "NO," there are not at least 4 operational, i.e., undegraded lanes in the cable 250, or, in other words, at least 8 of the 11 lanes are degraded, the process 300 proceeds to a determination 316. In at least some embodiments, the determination 316 includes asking if the cable 260 includes at least 4 undegraded lanes. If the results of the determination 316 is "YES," there are at least four undegraded lanes in the cable 260, and then the result is the cable 260 is designated as 4-lane operational mode 318, where such designation is understood to mean that 4 or more lanes are fully operational and that less than 7 lanes are degraded in the cable 260. Similarly, if the results of the determination 316 are "NO," there are not at least 4 operational, i.e., undegraded lanes in the cable 260, or, in other words, at least 8 of the 11 lanes are degraded. In addition, in some embodiments, the process 300 proceeds to a result of process 300 that further operational degrade modes for the combination of the two cables 250 and 260 is infeasible 320 due to the resultant low bandwidth thresholds. More specifically, once the total bandwidth of the two cables 250 and 260 originally associated with 22 lanes is decreased to that associated with less than 8 lanes in total, further operational degrading will not be allowed and the two cables 250 and 260 should be considered for replacement since the respective links are considered no longer operational. In each case for cables 250 and 260, the at least 4 inputs to the respective logical bus for the majority voting scheme are $L_0, L_1, L_2, L_3$.

In some embodiments, the links 270, 272, 280, and 282 not only include the portions of the lanes in the first, second, third, and fourth data communication lane groups 252, 256, 262, and 266, respectively, in the cables 250 and 260, respectively. Rather, the links 270, 272, 280, and 282 also include the respective communication mechanisms 216, 218, 220, and 222 embedded in the first node 212 and the respective communication mechanisms 236, 238, 240, and 242 embedded in the second node 232. Therefore, in at least some embodiments, the lane status determination module 144 is implemented to distinguish between lane degrades due to conditions in the cables 250 and 260 and lane degrades due to conditions in the drawers 210 and 230. In some embodiments, there is sufficient empirical data to indicate that the most likely source of lane degrading are those portions in the cabling due to the extended distances and the potential for inadvertent cutting, vibration, jostling, etc., as compared to the short distances and enclosure protection for the processor drawers and cabinets.

Figure 4:
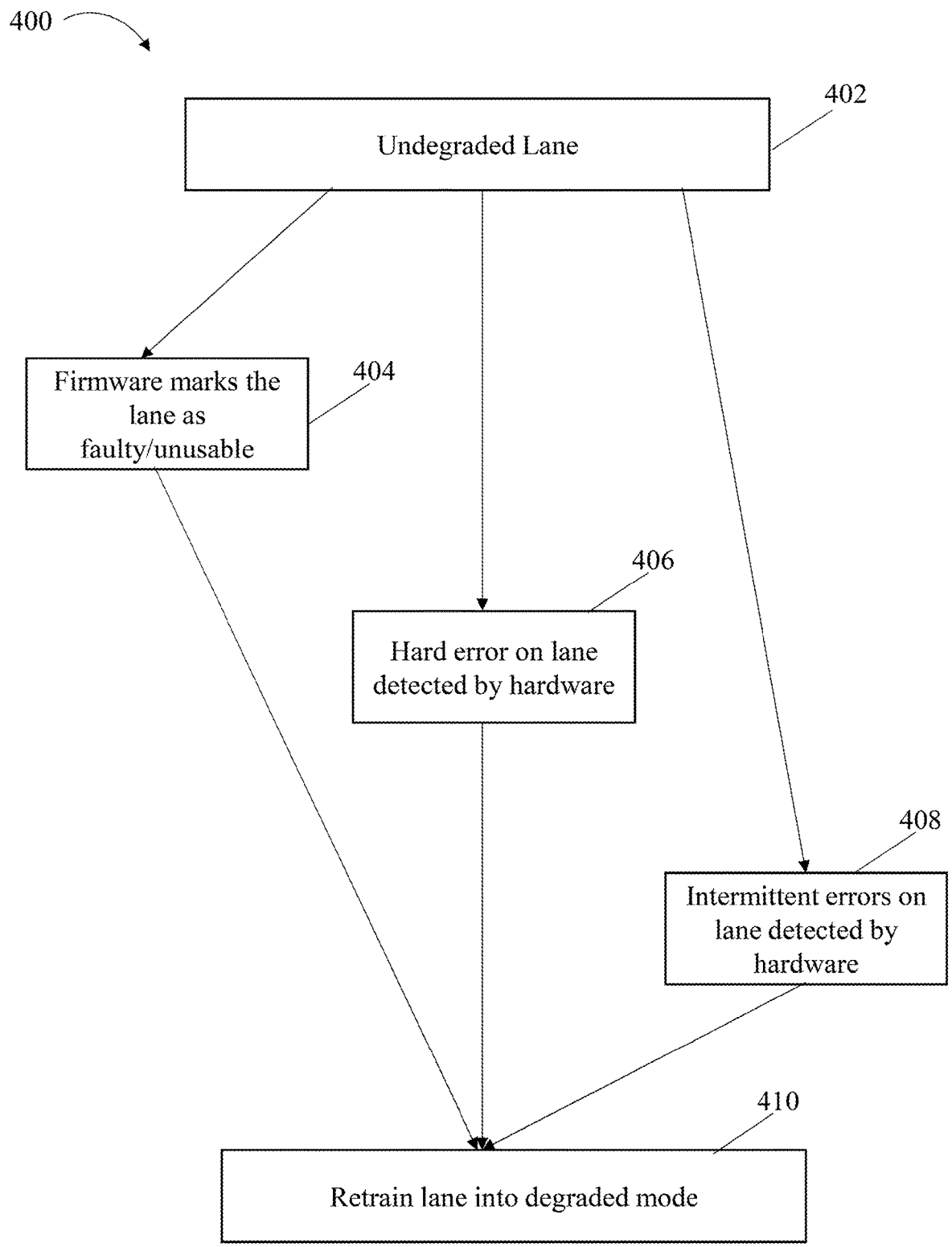
FIG. 4 is a flowchart illustrating a process for determining if the operational mode of the intercommunication scheme shown in FIGS. 2A-2C should be changed according to the process shown in FIG. 3, according to one or more embodiments of the present disclosure.

Referring to FIG. 4, a flowchart illustrating a process 400 for determining if the operational mode of the intercommunication scheme 200 shown in FIGS. 2A-2C should be changed according to the process 300 shown in FIG. 3, according to one or more embodiments of the present disclosure. As described above for the process 300, in at least some embodiments, the lane status determination module 144 (shown ion FIG. 1) is implemented to determine the status of the lanes at least periodically throughout the life span of the respective links. As such, the lane status determination module 144 checks the number of good lanes that are available at any given point of time through periodically detecting the health of any given lane. Therefore, generally, at any given point of time, the lane status determination module 144 able to identify which are the properly operating lanes and which are not properly operating.

In some embodiments, the lane status determination module 144 determines that one or more of the undegraded lanes no longer carry communications traffic with the same low error rate that they were designed for. Such circumstances may be due to events that may cause them to degrade, for example, and without limitation, a component of an undegraded lane 402 may underperform, certain clock voltages may have unusual values, and certain temperature parameters may be exceeded. In some embodiments, in addition, the lane status determination module 144 is configured to determine one or more conditions for changing the state of a lane that include, without limitation, firmware resources marking the affected lane as either faulty or unusable 404. In addition, such conditions include a hard error on the affected lane as detected by the associated hardware 406, and intermittent errors on the affected lane as detected by the associated hardware 408.

In some embodiments, once a lane has been identified to be underperforming with respect to the data communications traffic, a link retrain is triggered, i.e., the affected link, i.e., link 257, is retrained 410 into the degraded mode. Link retraining is a process by which the transmitter and receiver on a high-speed serial link communicate with each other in order to tune their equalization settings. The link (lane) equalization procedure facilitates components adjusting the transmitter and the receiver setup of each lane to improve the signal quality. The equalization procedure can be initiated either autonomously or by software. In some instances, the affected lane may not be recoverable and will be fully degraded and removed from service.

Regardless of the status of the links with respect to the number of undegraded lanes, the embodiments described herein are configured to regulate the dynamic degrading and retraining of the affected lanes while maintaining the capability of one or more links between the multiple processing devices with a multi-modality (see FIG. 3) to facilitate uninterrupted service between the processing devices embedded within multi-lane, multiprocessor computer systems, i.e., the system 100 with the scheme 200.

More specifically, the embodiments described herein facilitate the computer-implemented method for dynamically degrading links between multiple processing devices to facilitate uninterrupted service between the processing devices. The embodiments herein eliminate the requirement for both nodes to independently indicate the degradation of the respective data communication lane(s) (a serial operation). In addition, at least a portion of the data communication lanes are degraded even though there may be no remaining spare lanes. Further, if a cable is degraded to the point of being removed from service, the other cable is sufficient to maintain proper communications between the respective drawers. Moreover, the embodiments disclosed herein facilitate tuning the combination of latencies in the communications circuits such that the resultant physical circuit configuration includes one or more degrade-capable links. Accordingly, any critical traffic, e.g., time-of-day (ToD) information that facilitates synchronizing the time across the two nodes, where lack of such temporal synchronization may jeopardize proper execution of the associated operations, is communicated through the respective communication links during the degrade/retrain period.

Figure 5A:
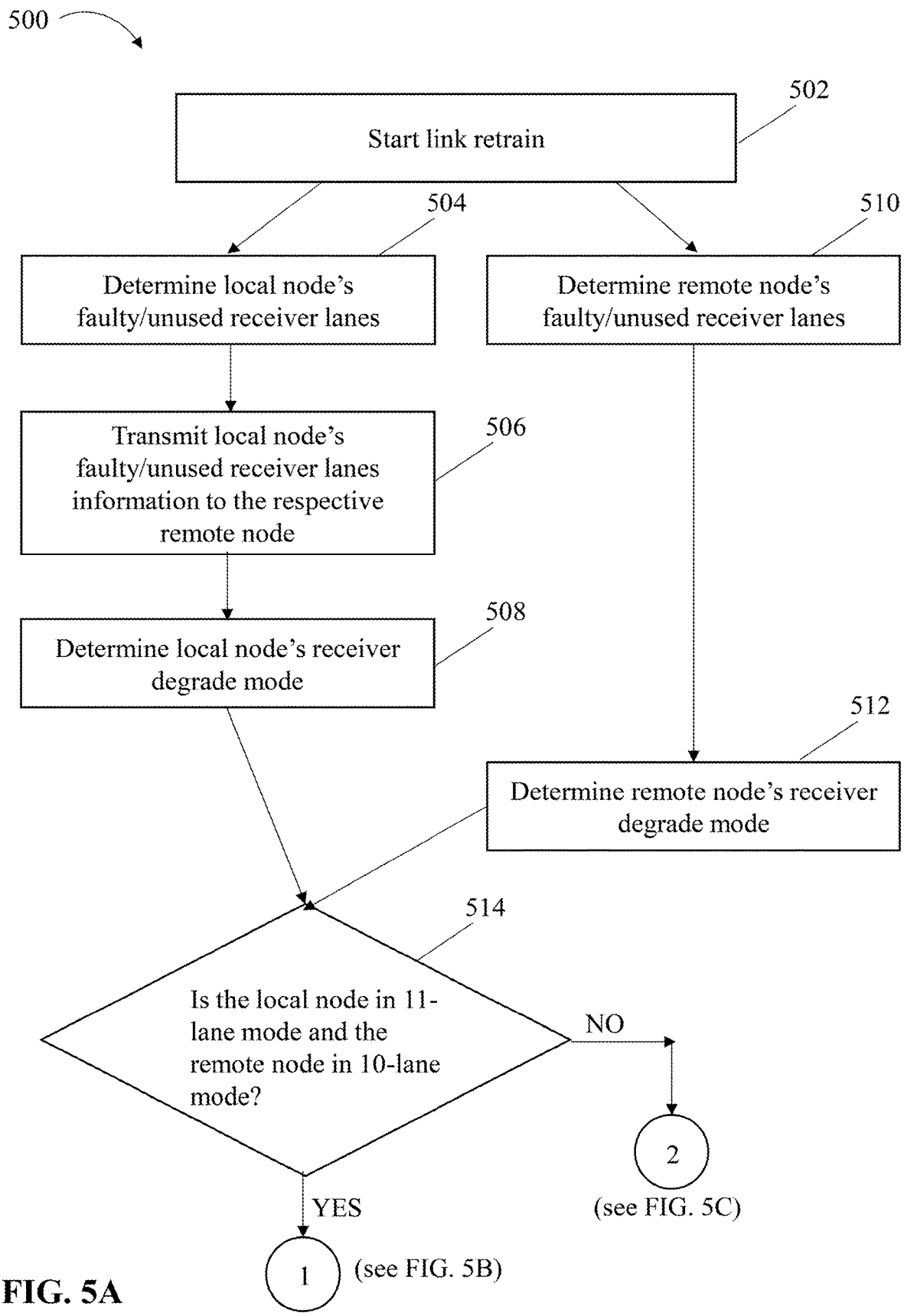
FIG. 5A is a flow chart illustrating a process for determining an operational degrade mode for the intercommunication scheme shown in FIGS. 2A-2C, according to one or more embodiments of the present disclosure.

Referring to FIG. 5A, a flow chart is presented illustrating a process 500 for determining an operational degrade mode for the intercommunication scheme shown in FIGS. 2A-2C, according to one or more embodiments of the present disclosure. Referring to the method step 410 (see FIG. 4), and also referring to FIGS. 1-2C, the retraining of the affected link 275 is started 502 through the link retrain control module 142. The process 500 includes determining 504 the local node's faulty/unused receiver lanes through the lane status determination module 144, as described with respect to FIGS. 3 and 4. As used herein, the "receiver lanes" for one node are the "transmission lanes" from the other node. In some embodiments, the first node 212 is the local node and the second node 232 is the remote node, herein referred to as the local/first node 212 and the remote/second node 232. In some embodiments, the first node 212 is the remote node and the second node 232 is the local node. The information associated with the faulty/unused receiver lanes between the local/first node 212 and the remote/second node 232 as determined 504 by the local/first node 212 is transmitted 506 to the remote/second node 232. As a result of the determine and transmit method steps 504 and 506, respectively, the receiver degrade mode of the local/first node 212 is determined 508 through the lane operational degrade mode determination module 146. The four operational degrade modes are described further herein.

In at least some embodiments, in parallel to the method steps 504 through 508 as previously described, the process 500 also includes determining 510 the remote node's faulty/unused receiver lanes through the lane status determination module 144 in a manner similar to that executed for the local/first node 212 (method step 504). As a result of the determine method step 512, the receiver degrade mode of the remote/second node 232 is determined 512 through the lane operational degrade mode determination module 146.

In one or more embodiments, the determinations 508 and 512 with respect to the operational degrade modes of the local/first node 212 and the remote/second node 232, respectively, are received at a determination 514 with respect to if the local/first node 212 is in an 11-lane mode (i.e., no degrade of any of the lanes (see 306 in FIG. 3)) and the remote/second node 232 is in a 10-lane mode (see 310 in FIG. 3). As previously described, the affected lane has already been identified, and at least a portion of the affected lane is physically degraded. In some embodiments, the roles of the local/first node 212 and the remote/second node 232 are reversed. Continuing the discussion with respect to the initially described conditions of the nodes 230 and 232, a "YES" result from the determination 514 is discussed with respect to FIG. 5B herein. A "NO" result from the determination 514 is discussed with respect to FIG. 5C herein.

Figure 5B:
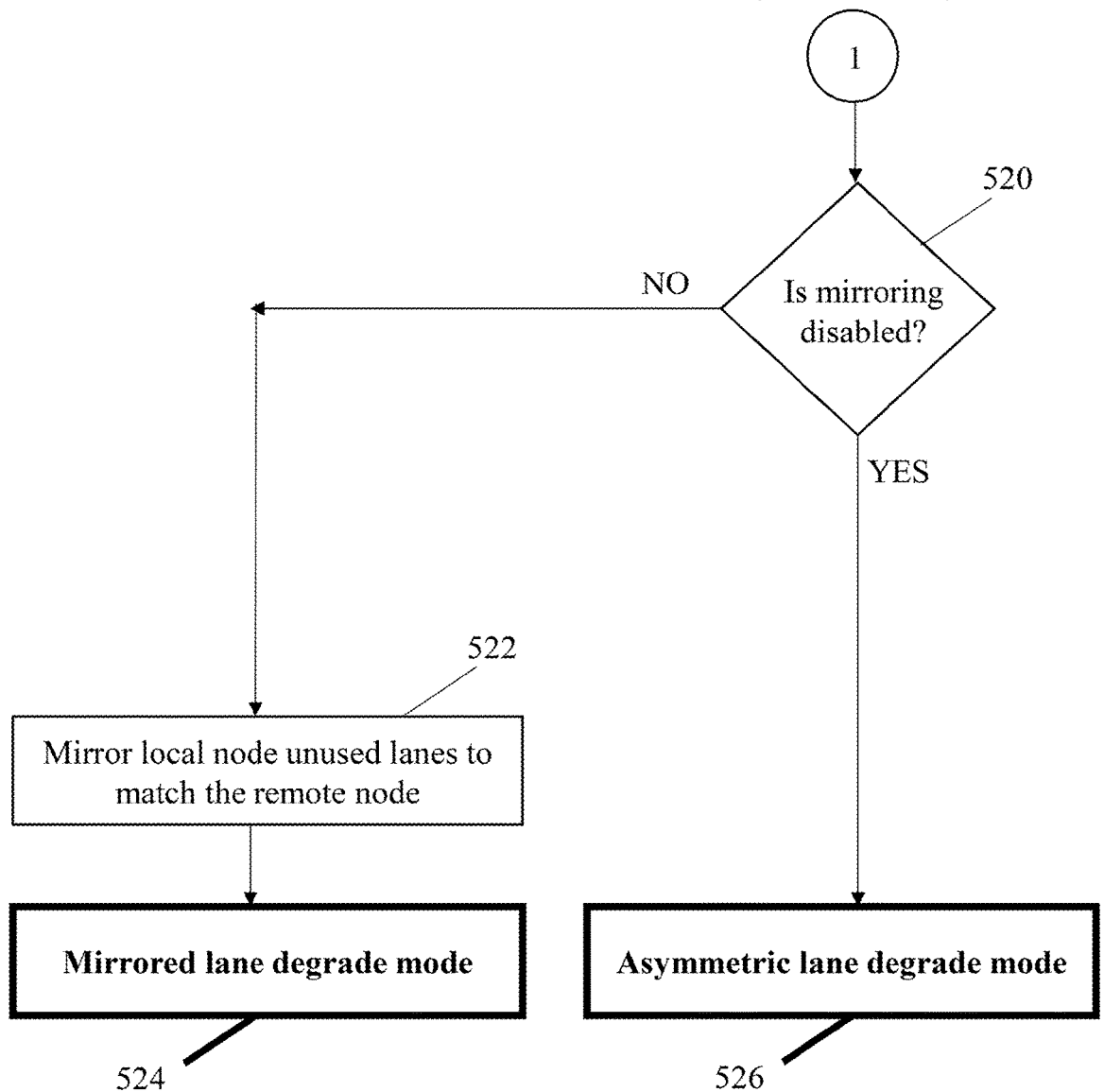
FIG. 5B is a continuation of the flowchart shown in FIG. 5A, in accordance with some embodiments of the present disclosure.

Referring to FIG. 5B, a continuation of the flowchart for the process 500 from FIG. 5A is presented, in accordance with some embodiments of the present disclosure. Continuing to refer to FIGS. 1-2C, 3, and 5A, a "YES" result from the determination 514 indicates that both the local/first node 212 is in an 11-lane mode 306 and the remote/second node 232 is in a 10-lane mode 310. The process 500 proceeds to a determination 520 with respect to if mirroring is disabled. As used herein, the term "mirroring" is used to indicate that a degrade status of one portion of a lane that includes, for example, a first transmission direction from the remote/second node 232 to the local/first node 212 that has been degraded to a "bad" status, will result in the associated portion of the lane that is a second transmission direction from the local/first node 212 to the remote/second node 232 also being degraded to a "bad" status to "mirror" the first transmission direction, thereby substantially removing the lane from service (see FIG. 7 herein). Mirroring may be a function that is selected, in some embodiments, on a lane-by-lane basis, and, in some embodiments, a cable-by-cable and/or a link-by-link basis.

In some embodiments, if the result of the determination 520 is "NO," and the process 500 proceeds to mirror the lane degrade for the portion of the lane used to receive the communications by the remote/second node 232 as transmitted from the local/first node 212 to the portion of the lane used by the local/first node 212 to receive communications transmitted from the remote/second node 232, thereby executing a mirrored lane degrade mode 524 (see FIG. 7) such that the affected lane is substantially removed from service and is now unused. The transition to the mirrored lane degrade mode 524 is executed through the lane operational degrade mode determination module 146. In contrast, if the result of the determination 520 is "YES," the mirroring features are disabled, the portion of the lane that is operating satisfactorily is not degrade and is allowed to remain in service, thereby maintaining an asymmetric lane degrade mode 526 (see FIG. 8 herein) through the lane operational degrade mode determination module 146.

Figure 5C:
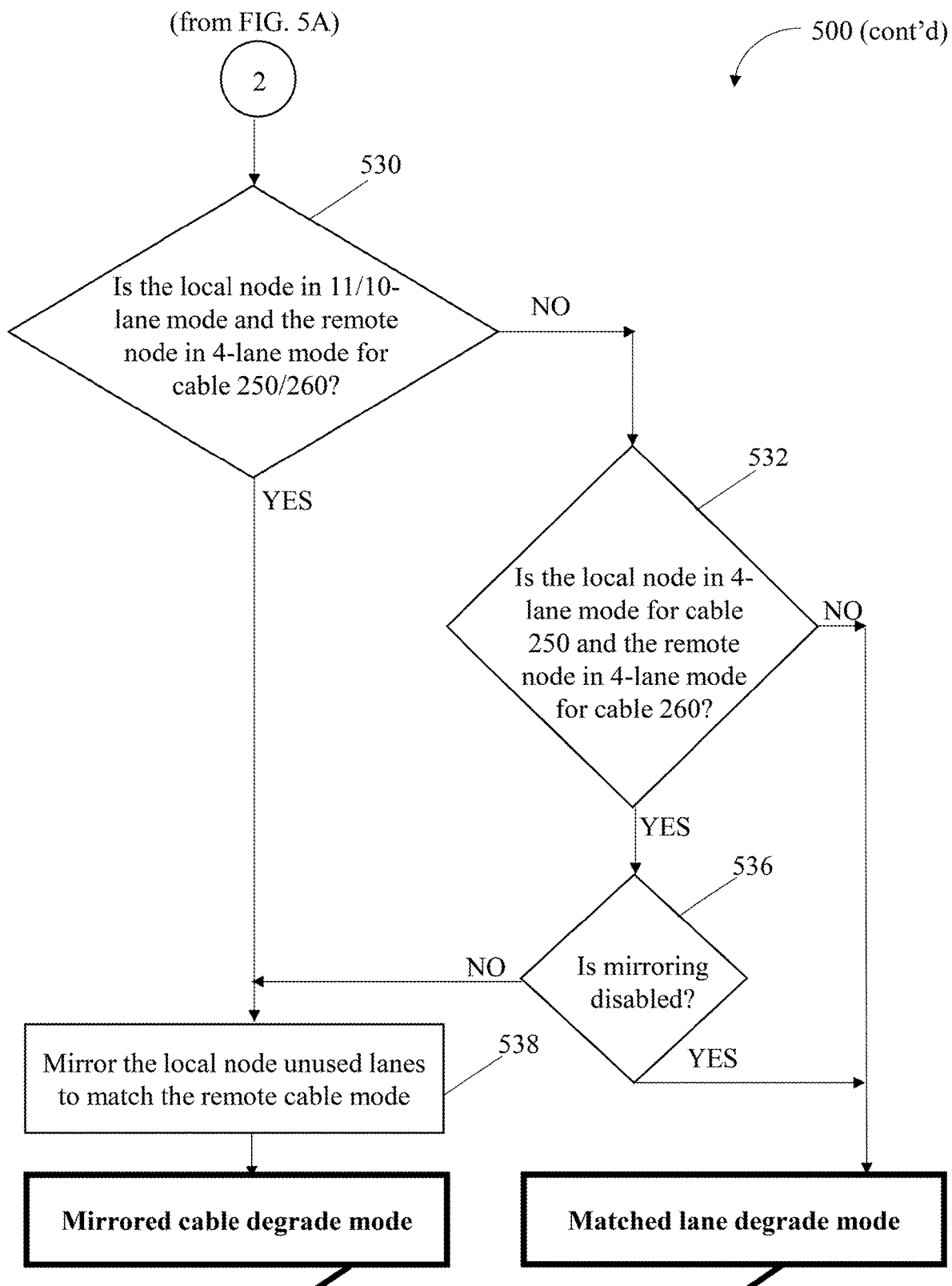
FIG. 5C is a continuation of the flowchart shown in FIG. 5A, in accordance with some embodiments of the present disclosure.

Referring to FIG. 5C, a continuation of the flowchart for the process 500 from FIG. 5A is presented, in accordance with some embodiments of the present disclosure. Continuing to refer to FIGS. 1-2C, 3, and 5A, a "NO" result from the determination 514 indicates that either the local/first node 212 is not in an 11-lane mode 306 and/or the remote/second node 232 is not in a 10-lane mode 310. If the local/first node 212 is not in an 11-lane mode 306, then it is in a 10-lane operational node 310, a 4-lane operational node 314, therebetween, or fully removed from service. With respect to the remote/second node 232 not in a 10-lane mode 310, the circumstances where the roles of the nodes 212 and 232 are reversed with respect to the determination 514 are described with respect to FIG. 5A. Otherwise, if the remote/second node 232 is not in a 10-lane mode 310, then it is in a 4-lane operational mode 314, between the 10-lane operational mode 310 and the 4-lane operational mode 314, or fully removed from service.

Therefore, in some embodiments, the process 500 proceeds to a determination 530 if the local/first node 212 in 11/10-lane mode (306/310, respectively) and the remote/second node 232 is in the 4-lane mode for either of cable 250 (314) and cable 260 (318). A response to the determination of "NO" to the determination 530 results in the process 500 to proceed to a determination 532 toward if the local/first node 212 is in 4-lane mode for cable 250 (314) (rather than the 10-lane mode 310) and the remote node is in 4-lane mode for cable 260 (318). A "NO" response to the determination 532 results in the process 500 proceeding to shifting the link to a matched lane degrade mode 534 (see FIG. 9 herein) through the lane operational degrade mode determination module 146.

In some embodiments, in the event of a "YES" response to the determination 532, the process 500 proceeds to a determination 536 with respect to if mirroring is disabled. A "YES" response to the determination 536 results in the link shifting to the matched lane degrade mode 534 through the lane operational degrade mode determination module 146.

Figure 10:
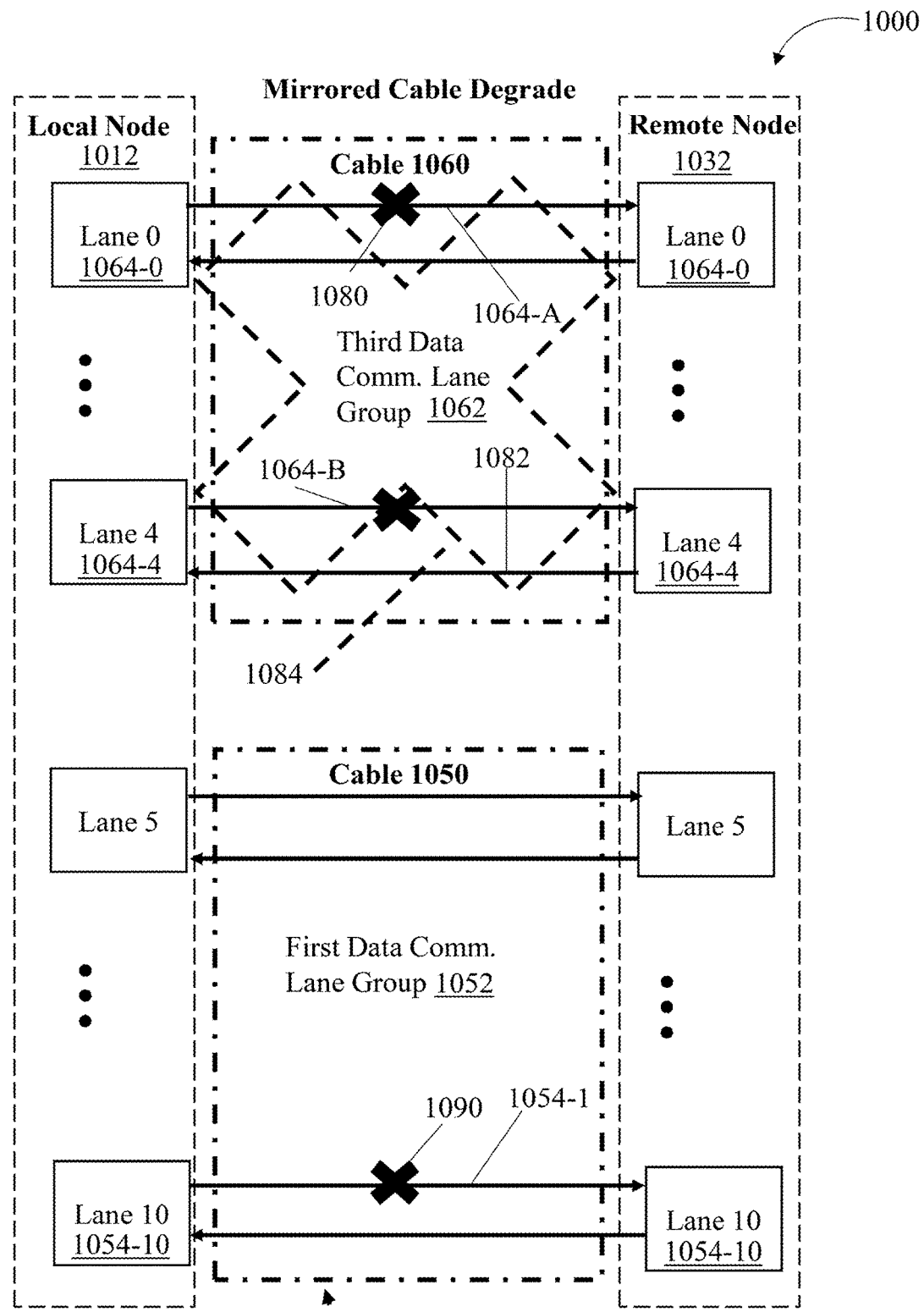
FIG. 10 is a block diagram illustrating a mirrored cable degrade for the intercommunication scheme shown in FIGS. 2A-2C, in accordance with some embodiments of the present disclosure.

In one or more embodiments, each of a "YES" response to the determination 530 and a "NO" response to the determination 536 results in the process 500 proceeding to the mirroring 538 the unused lanes of the local/first node 212 to match a remote cable mode through shifting the link to a mirrored cable degrade mode 540 (described further with respect to FIG. 10).

Accordingly, the process 500 facilitates determining the operational degrade mode for the links in the intercommunication scheme shown in FIGS. 2A-2C in the event of a lane degrade operation to one of the mirrored lane degrade mode 524 (see FIG. 7), the asymmetric lane degrade mode 526 (see FIG. 8), the matched lane degrade mode 534 (see FIG. 9), and the mirrored cable degrade mode 540 (see FIG. 10).

Figure 6A:
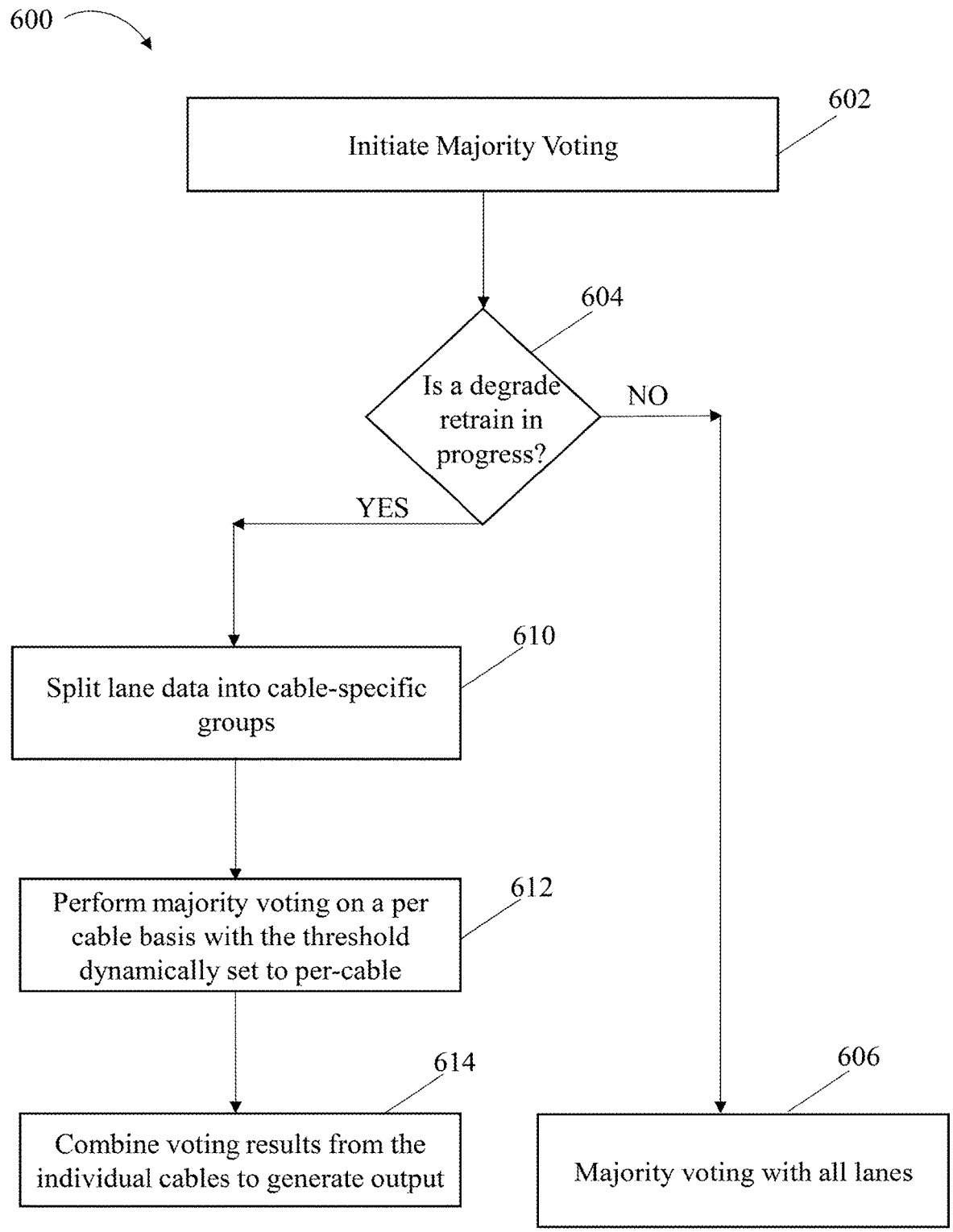
FIG. 6A is a block diagram illustrating a process for majority voting, in accordance with some embodiments of the present disclosure.

Referring to FIG. 6A, a block diagram is presented illustrating a process 600 for majority voting, in accordance with some embodiments of the present disclosure. Also referring to FIGS. 1, 2A-2C, 3, and 4, in some embodiments, the majority voting process 600 is executed continuously to control the nature of the message packets (not shown) that are transmitted across the cables 250 and 260, as managed through the majority voting module 148.

The process 600 for majority voting facilitates determining the nature of the communication traffic that will be permitted to transit through the respective link as the link enters a degraded condition where priority will be extended to those messages between the two nodes 212 and 232 associated with any critical traffic, e.g., time-of-day (ToD) information that facilitates synchronizing the time across the two nodes 212 and 232. Such prioritization of the traffic facilitates such synchronization when the number of lanes remaining in the link undegraded drops below a threshold value such that the bandwidth of the link is below that typically available for the design communication traffic. Therefore, for the remaining lanes (and cables) available, some of the traffic messages are prioritized over other messages.

The process 600 includes initiating 602 the majority voting process 600 and proceeds to a determination 604 with respect to whether a link degrade/retrain is in progress, i.e., if one or more lanes are being retrained 410 into a degraded mode (see FIG. 4). If the response to the determination 604 is "NO," the process 600 continues to use majority voting 606 with all of the undegraded lanes together. The majority voting includes analyzing all of the collected lane-related inputs together, where a requested message packet type receives one vote per lane. Accordingly, the message packet type that received more votes than any other message packet type receives temporal priority for transmission through the link 275.

Figure 6B:
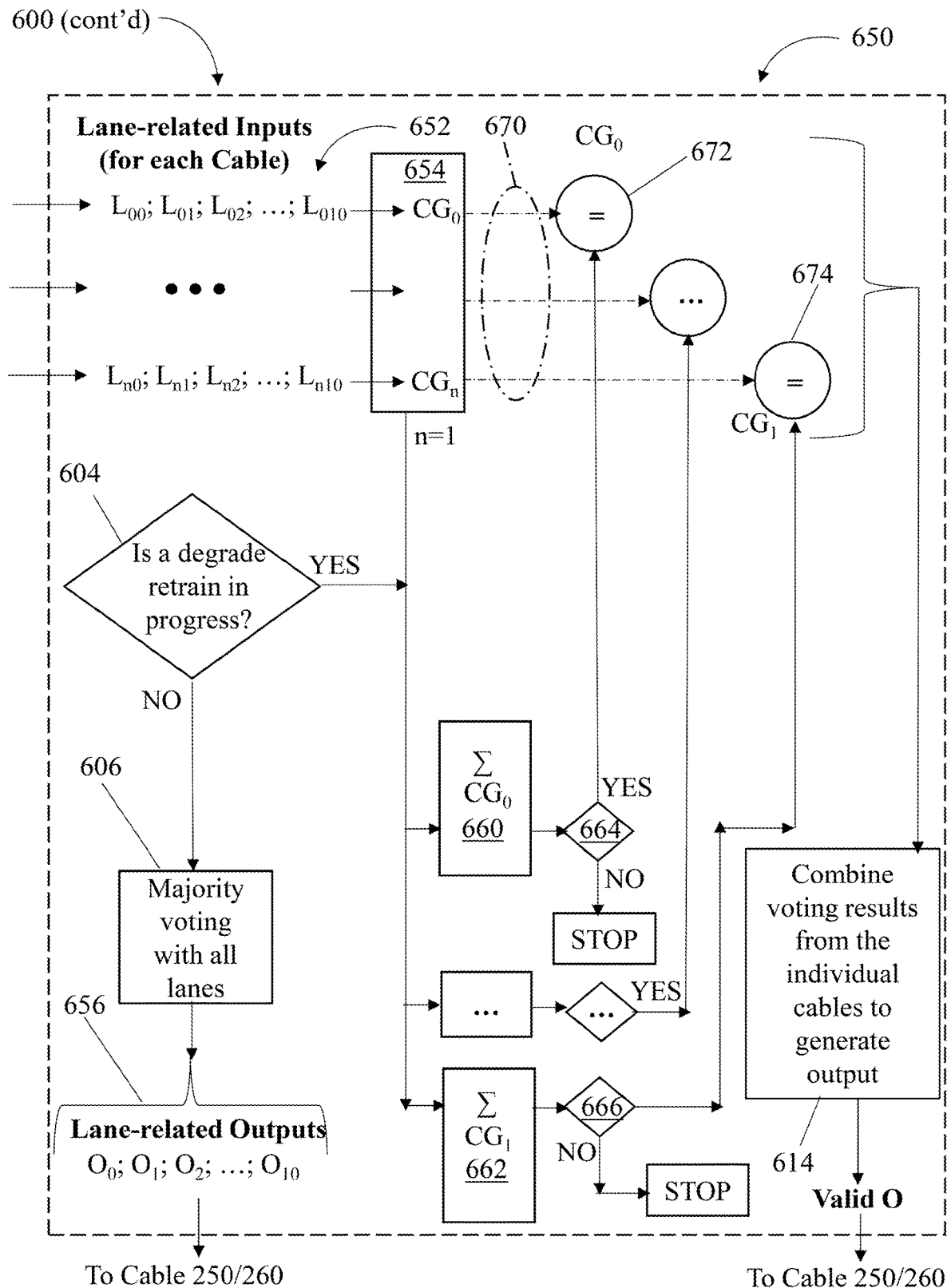
FIG. 6B is a schematic block diagram further illustrating the process for majority voting as presented in FIG. 6A, in accordance with some embodiments of the present disclosure.

Also referring to FIG. 6B, a schematic block diagram is presented further illustrating the process 600 for majority voting as presented in FIG. 6A, in accordance with some embodiments of the present disclosure. More specifically, FIG. 6B illustrates a bit-wise majority voting scheme 650 of using of lane inputs for the majority voting process 600. In one or more embodiments, a signal (bit) for each of the lanes in a respective link is obtained, i.e., lane-related inputs 652 for each cable are received by the majority voting module 148 as shown in FIG. 6B as $L_{00}$; $L_{01}$; $L_{02}$; ...; $L_{010}$ through $L_{n0}$; $L_{n1}$; $L_{n2}$; ...; $L_{n10}$, where n equals the number of cables in the link minus one. For example, in the embodiments discussed herein, the lane-related inputs are $L_{00}$; $L_{01}$; $L_{02}$; ...; $L_{010}$ for the cable 250 and $L_{10}$; $L_{11}$; $L_{12}$; ...; $L_{110}$ for the cable 260. Such lane-related inputs 652 include, for example, and without limitation, the type of information to be transmitted, e.g., critical message packets such as ToD synchronizing. In addition, the lane-related inputs 652 include, for example, and without limitation, the status of the respective lanes, i.e., degraded or not degraded. In some embodiments, those lanes that are degraded generate no lane-related inputs 652.

The lane-related inputs 652 are transmitted to a logical bus 654, where the lane-related inputs 652 are collected. Referring to the determination 604 (repeated in FIG. 6B from FIG. 6A), if a link degrade/retrain is not in progress (a "NO" response), then majority voting 606 (also repeated in FIG. 6B from FIG. 6A) with all of the lane-related inputs 652 is executed. As discussed with respect to the process step 306 discussed with respect to FIG. 3, in at least some embodiments, when the process 300 includes a determination 304 as to if the number of undegraded lanes 254, 256, 264, and 266 in each of the cables 250 and 260 is equal to 11 undegraded lanes, and the majority voting 606 includes all lanes, the lack of any degraded lanes results in the use of all 11 lanes in one of, or each of, the cables 250 and 260. As previously described, the respective logical bus 654 includes an input from each of the lanes with respect to the type of information to be transmitted in the associated pending message packet type through the bit-wise majority voting scheme 650.

In some embodiments, the majority voting method step 606 is executed, where the majority type of message to be transmitted across the link is determined, i.e., that requested message packet type that received the most instances thereof is selected to be transmitted in the next cycle to the respective cables 250 and/or 260, where such message type designations are instructed as shown by the lane-related outputs of $O_0, O_1, O_2, \ldots, O_{10}$. Accordingly, the bit-wise voting facilitates determining what each bit of output data should be.

Referring again to FIG. 6A as well as FIG. 6B, a "YES" response to the determination 604 results in the lane-related inputs 652 being split 610 into the respective cable-specific groups, e.g., a first cable group $CG_0$ through an $n^{th}$ cable group $CG_n$, where n is variable as previously described, and in the present embodiment, $CG_0$ is related to cable 250 and $CG_1$ is related to cable 260. The intermediate lane- and cable-related items labeled with " . . . " are shown for describing those embodiments that have more than two cables. As such, the lane-related inputs 652 for each cable group $CG_0$ and $CG_1$ are collected at the logical bus 654 and the values of the lane-related inputs 652 for the previously degraded lanes that are not the subject of the present link retraining, if available, are ignored for the subsequent steps of the present analyses.

The process 600 proceeds to shift the majority voting process 600 to performing 612 majority voting on a per cable basis with the threshold dynamically set on per-cable basis, where the lane-related inputs 652 are analyzed on a per-cable basis. For $CG_0$, the lane-related inputs 652 for the cable 250 for those available undegraded lanes are transmitted to a summation operator 660 that counts the number of lanes therein to facilitate a subsequent threshold analysis. Similarly, for $CG_0$, the lane-related inputs 652 for the cable 260 for those available undegraded lanes are transmitted to a summation operator 662 that counts the number of lane-related inputs 652 therein to facilitate a subsequent threshold analysis. The resultant sums 660 and 662 are compared to predetermined threshold values in a respective comparison determination steps 664 and 666, respectively. If the values of the sums 660 and 662 are greater than or equal to the respective threshold values, the lane-related inputs are forwarded to the next stop of the voting scheme 650 (discussed further).

In at least some embodiments, the respective threshold values resident within the respective comparison determination steps 664 and 666 are automatically and dynamically adjustable, i.e., at the initiation of a link retrain (see 502 in FIG. 5) in conjunction with initiating 602 the majority voting process 600, the threshold value is dynamically and automatically adjusted, where each threshold value is based on the respective cable. In some embodiments, the respective per-cable thresholds are based on the present operational degrade mode as established per FIG. 3 herein. More specifically, in some embodiments, once the present link retrain is complete per FIGS. 5A-5C and 6A-6B, the voting thresholds on a per-cable basis resident within the respective comparator determinations 664 and 666 are adjusted depending on the operational degrade mode as established per FIG. 3 herein. In some embodiments, the various values for the thresholds are implemented on firmware. In at least some embodiments, the thresholds established as a function of the present operational degrade mode are an indication of the number of lanes that are needed for successful communications and a sufficient number of relevant voting inputs.

In some embodiments, if either of the comparator determinations 664 and 666 indicate that the number of undegraded lanes associated with the respective $CG_0$ and $CG_1$ is less than the respective threshold value, i.e., a "NO" response is generated, the process for that cable group is stopped. When the number of undegraded lanes on a per cable basis is equal to or exceeds the respective threshold values, the voting scheme 650 proceeds to transmitting the lane-related inputs 670 to respective matching operators 672 and 674. The matching operators 672 and 674 are used upon receipt of the respective "YES" determinations from the respective comparator determinations 664 and 666. The matching operators 672 and 674 sort the lane-related inputs 670 that do not include degraded lanes based on the type of message to be transmitted across the respective cables, e.g., ToD message packets. Accordingly, the foremost ranking type of message to be transmitted across the respective cables 250 and 260 is transmitted for each of the cable groups $CG_0$ and $CG_1$ to the next step in the process 600 of combining 614 the voting results from the individual cables to generate a valid output. In some embodiments, the critical (ToD) message packets are provided priority using any prioritization mechanisms including, without limitation, type-weighting and express override of routine or lower priority traffic. Once the present link retrain is complete per FIGS. 5A-5C and 6A-6B, the voting thresholds on a per-cable basis resident within the respective comparator determinations 664 and 666 are adjusted depending on the operational degrade mode as established per FIGS. 3 and 5A-5C herein.

In one or more embodiments, as the retrain of the link 275 is ongoing, critical message packets such as ToD message packets are permitted to be transported across the affected cables uninterrupted without the previously described latencies associated with the receipt of independent inputs from each of the two respective nodes associated with the affected lane(s) during a link retrain. Therefore service between the nodes 212 and 232 remain uninterrupted. Such a feature is enabled through executing the majority voting process 600 through the bit-wise majority voting scheme 650 regardless of any other system/link activities associated with the link retrain. Such other system/link activities include the latencies associated with the affected link being removed from operational service such that it is incapable of handling any functional communication traffic, including the ToD message packets. Therefore, even if the other cable of a two-cable link is fully inoperative, the ToD message packets are still transmitted across the one or more of the lanes of the other cable that are still operable, including during link retrains.

Figure 7:
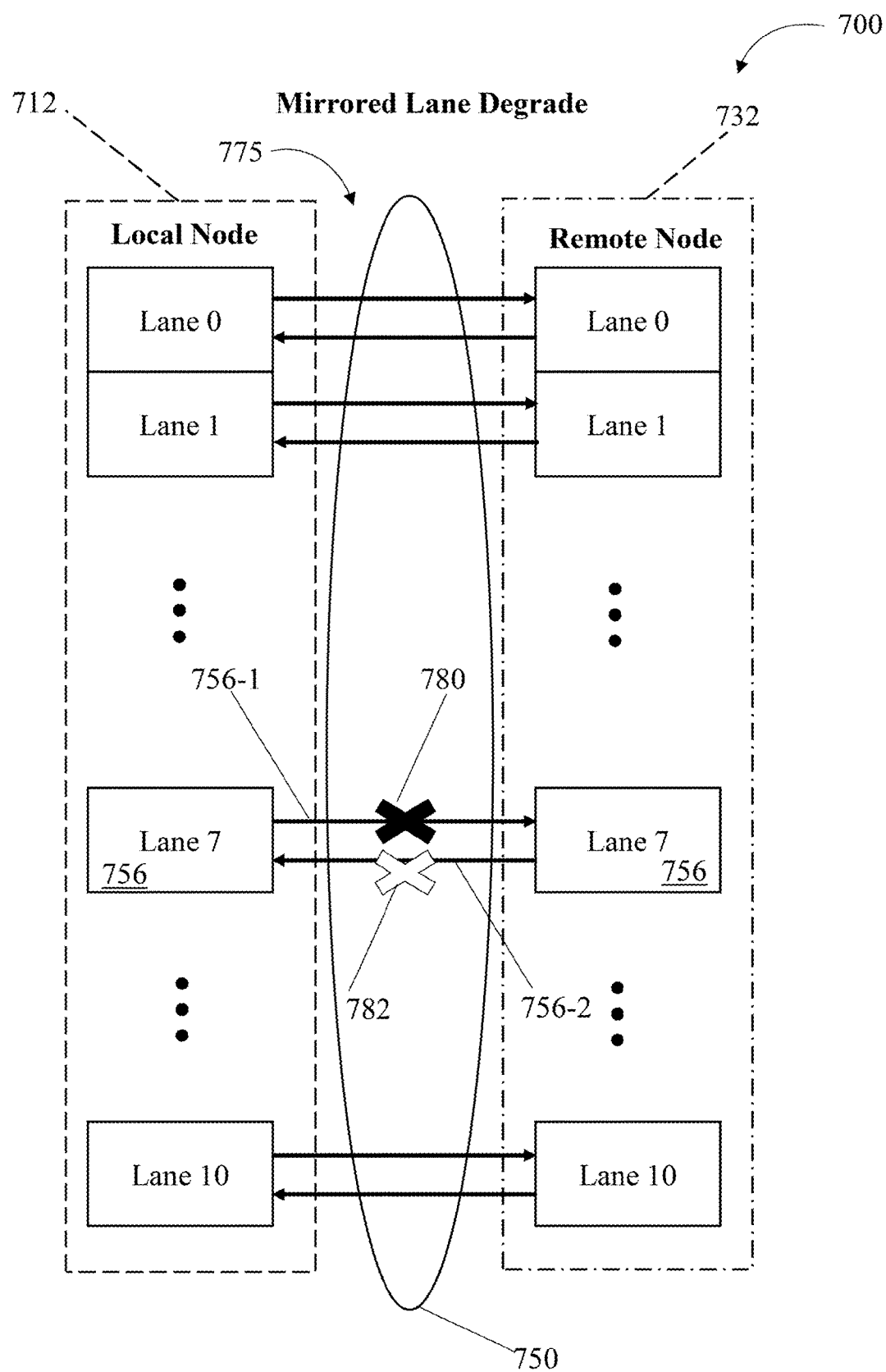
FIG. 7 is a block diagram illustrating a mirrored lane degrade scheme for the intercommunication scheme shown in FIGS. 2A-2C, in accordance with some embodiments of the present disclosure.

Referring to FIG. 7, a block diagram is presented illustrating a mirrored lane degrade scheme 700 for the intercommunication scheme 200 shown in FIGS. 2A-2C, in accordance with some embodiments of the present disclosure. Portions of the intercommunication scheme 200 are shown in FIG. 7 to illustrate the single mirrored lane degrade scheme 700. The first cable 750 is positioned between the local/first node 712 and the remote/second node 732 to at least partially define the link 775. The process 500 as previously described with respect to FIGS. 5A and 5B herein is used to determine the operational degrade mode of the present conditions. A lane 756, i.e., lane 7 experiences a degrade condition 780 on a first directional portion 756-1 of the lane 7, i.e., it is marked either "bad" or "unused." The first directional portion 756-1 is one of 11 receiver lanes for the remote/second node 732, and a corresponding second directional portion 756-2 of the lane 7 is one of the 11 receiver lanes for the local/first node 712. Therefore, the result of the determination step 514 is "YES," and with mirroring not disabled (a "NO" result to the determination step 520), as a consequence, the corresponding second directional portion 756-2 of the lane 7 is designated similarly, i.e., with a degrade condition 782 to mirror the first directional portion 756-1 of the lane 7. Accordingly, the remaining 10 lanes 0 through 6 and 8 through 10 are used to transmit the communication traffic through the link 775 bi-directionally as shown.

In some embodiments, the mirrored lane degrade mode 524 as shown in the mirrored lane degrade scheme 700 facilitates balancing the communication traffic in both directions between the respective nodes. In general, in the event that a lane goes bad in a first direction of a respective link from a first node to a second node, two options are presented. The first option is to maintain the second node-to-first node bandwidth as is while the first node-to-second node bandwidth is decreased by the loss of the bandwidth associated with the bad lane (as discussed further with respect to FIG. 8). This option facilitates optimizing the bandwidth between the two nodes with a cost of additional resource allocation to manage the additional control information necessary to manage the communications routing through the asymmetric configuration. Alternatively, with respect to FIG. 7, the second option includes removing the second node-to-first node direction of the affected lane, thereby also decreasing the bandwidth in that direction. In the mirrored configuration, the slightly poorer system performance due to the decreased bidirectional bandwidth with avoiding the need for resource utilization to manage any asymmetries. As previously described, in at least some embodiments, the selection of the mirrored lane degrade mode 524 is used to determine the thresholds as used in the comparison determination steps 664 and 666 (see FIG. 6B).

Figure 8:
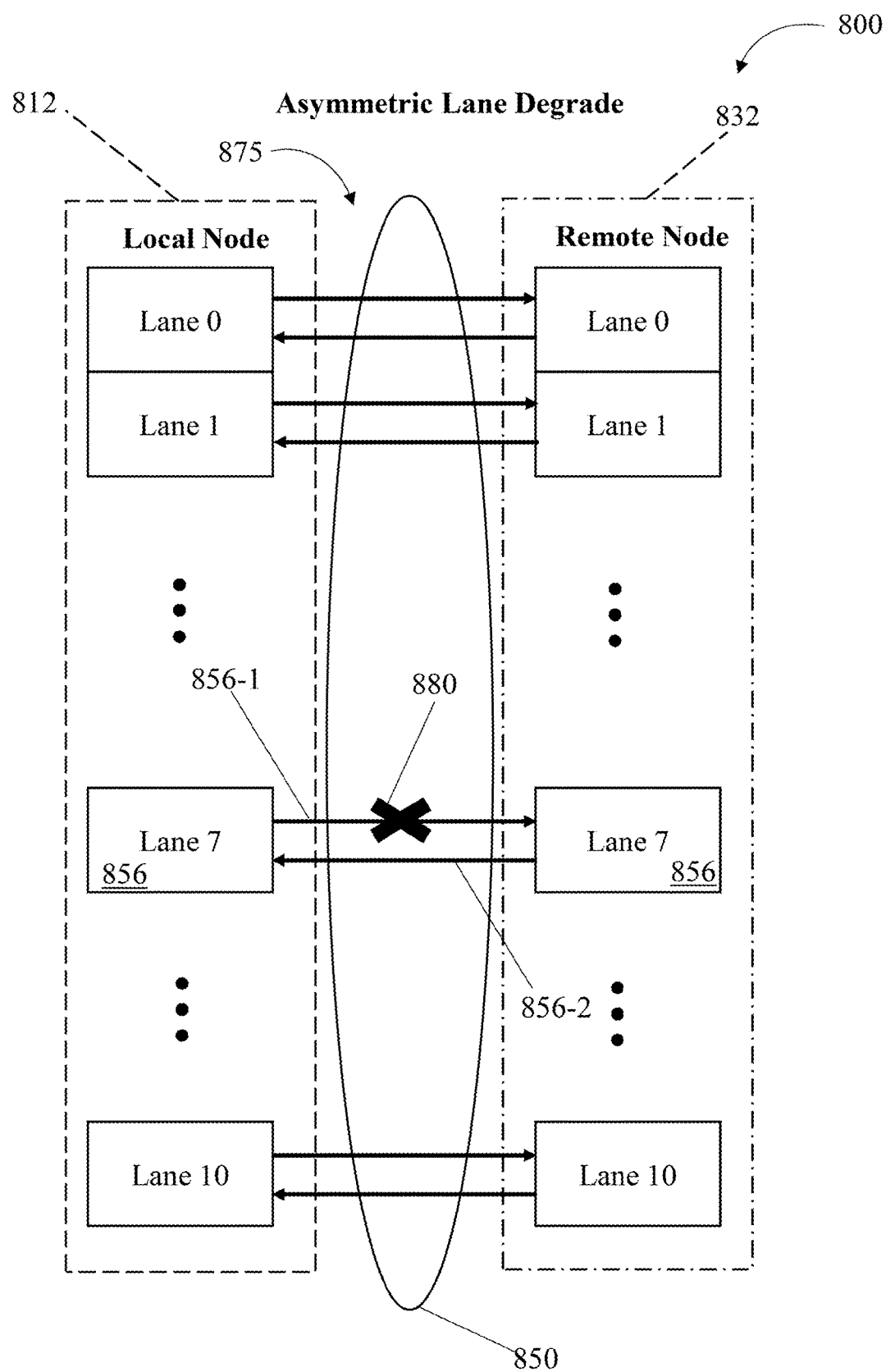
FIG. 8 is a block diagram illustrating a asymmetric lane degrade for the intercommunication scheme shown in FIGS. 2A-2C, in accordance with some embodiments of the present disclosure.

Referring to FIG. 8, a block diagram is presented illustrating an asymmetric lane degrade scheme 800 for the intercommunication scheme 200 shown in FIGS. 2A-2C, in accordance with some embodiments of the present disclosure. Portions of the intercommunication scheme 200 are shown in FIG. 8 to illustrate the single mirrored lane degrade scheme 800. The first cable 850 is positioned between the local/first node 812 and the remote/second node 832 to at least partially define the link 875. The process 500 as previously described with respect to FIGS. 5A and 5B herein is used to determine the operational degrade mode of the present conditions. A lane 856, i.e., lane 7 experiences a degrade condition 880 on a first directional portion 856-1 of the lane 7, i.e., it is marked either "bad" or "unused." The corresponding portion 856-2 remains fully operational. The first directional portion 856-1 is one of 11 receiver lanes for the remote/second node 832, and a corresponding second directional portion 856-2 of the lane 7 is one of the 11 receiver lanes for the local/first node 812. Therefore, the result of the determination step 514 is "YES," and with mirroring disabled (a "YES" result to the determination step 520), as a consequence, the 11 lanes between the local/first node 812 and the remote/second node 832 include 10 paths for transmission from the local/first node 812 and receipt by the remoter/second node 832. In addition, the 11 lanes between the remote/second node 832 and the local/first node 812 include 10 paths for transmission from the remote/second node 832 and receipt by the local/first node 812.

In some embodiments, the asymmetric lane degrade mode 526 as shown in the asymmetric lane degrade scheme 800 does not significantly affect the balance of the communication traffic in both directions between the respective nodes, such that the artificial removal of a portion of a lane is not necessary. Therefore, in at least some embodiments, the link degrade for both nodes 812 and 832 do not necessarily have to be identical. As previously described, in at least some embodiments, the selection of the asymmetric lane degrade mode 526 is used to determine the thresholds as used in the comparison determination steps 664 and 666 (see FIG. 6B).

Figure 9:
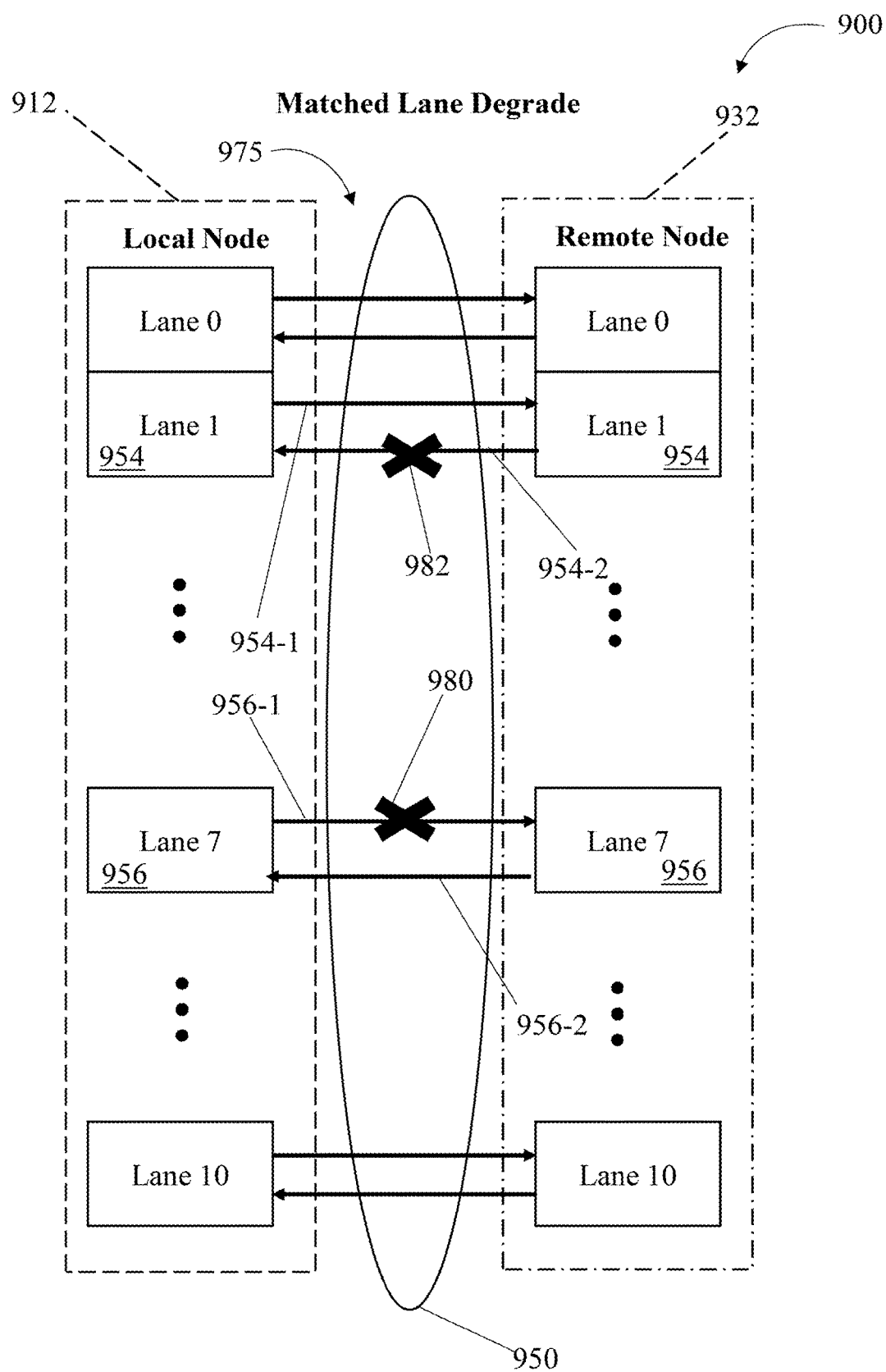
FIG. 9 is a block diagram illustrating a matched lane degrade for the intercommunication scheme shown in FIGS. 2A-2C, in accordance with some embodiments of the present disclosure.

Referring to FIG. 9, a block diagram is presented illustrating a matched lane degrade scheme 900 for the intercommunication scheme shown in FIGS. 2A-2C, in accordance with some embodiments of the present disclosure. Portions of the intercommunication scheme 200 are shown in FIG. 9 to illustrate the matched lane degrade scheme 900. The first cable 950 is positioned between the local/first node 912 and the remote/second node 932 to at least partially define the link 975. The process 500 as previously described with respect to FIGS. 5A and 5C herein is used to determine the operational degrade mode of the present conditions. A lane 956, i.e., lane 7 experiences a first degrade condition 980 on a first directional portion 956-1 of the lane 7, i.e., it is marked either "bad" or "unused." The corresponding portion 956-2 remains fully operational. A lane 954, i.e., lane 1 experiences a degrade condition 982 on a second directional portion 954-2 of the lane 1, i.e., it is marked either "bad" or "unused." The corresponding portion 954-1 remains fully operational. Therefore, the result of the determination step 530 is "NO" and the result of the determination step 532 is "NO" (neither of the local and remote nodes are in 4-lane mode), and as a consequence, the 11 lanes between the local/first node 912 and the remote/second node 932 include 10 paths for transmission from the local/first node 912 and receipt by the remote/second node 932. In addition, the 11 lanes between the remote/second node 932 and the local/first node 912 include 10 paths for transmission from the remote/second node 932 and receipt by the local/first node 912. As such, the equivalent of 10 lanes in the link 975 is fully operational.

In some embodiments, the matched lane degrade mode 534 as shown in the matched lane degrade scheme 900 facilitates maintaining the balance of the communication traffic in both directions between the respective nodes. As previously described, in at least some embodiments, the selection of the matched lane degrade mode 534 is used to determine the thresholds as used in the comparison determination steps 664 and 666 (see FIG. 6B).

Referring to FIG. 10, a block diagram is presented illustrating a mirrored cable degrade scheme 1000 for the intercommunication scheme shown in FIGS. 2A-2C, in accordance with some embodiments of the present disclosure. Portions of the intercommunication scheme 200 are shown in FIG. 10 to illustrate the mirrored cable degrade scheme 1000. The first cable 1050 and the second cable 1060 are positioned between the local/first node 1012 and the remote/second node 1032 to at least partially define the link 1075. The process 500 as previously described with respect to FIGS. 5A and 5C herein is used to determine the operational degrade mode of the present conditions. The connectivity between the local/first node 1012 and the remote/second node 1032 for the first processing device 204-1 and the third processing device 204-3 (see FIG. 2A) through the third data communication lane group 1062 in the cable 1060 (see FIG. 2C) and the first data communication lane group 1052 in the cable 1050 (see FIG. 2B) is shown. A lane 1064, i.e., lane 0 experiences a first degrade condition 1080 on a first directional portion 1060-A of the lane 0, i.e., it is marked either "bad" or "unused."

In addition, a lane 1064-4, i.e., lane 4 experiences a second degrade condition 1082 on a first directional portion 1060-B of the lane 4, i.e., it is marked as either "bad" or "unused." Therefore of the five lanes resident within the cable 1060 for the third data communication lane group 1062 in the cable 1060, two are marked, while the other three lanes are maintained as fully operational. In addition, the six lanes associated with the fourth data communication lane group 266 (not shown in FIG. 10, see FIG. 2C) also resident in the cable 1060 are already fully degraded. Therefore, the cable 1060 includes only three fully functional lanes. Moreover, for the cable 1050, a lane 1054-10, i.e., lane 10 experiences a third degrade condition 1090 on a first directional portion 1064-1 of the lane 10, i.e., it is marked as either "bad" or "unused." The remaining 10 lanes in the cable 1050 are fully functional. As such, the local/first node 1012 includes 11 operational lanes for receiving communications from the remote/second node 1032, while the remote/second node includes 8 operational lanes for receiving communications from the local/first node 1012. Therefore, the result of the determination step 530 is "YES" (the remote/second node 1032 has more than 4 receiving lanes available), and as a consequence, the mirrored cable degrade mode 540 is selected, the operational functionality of the undegraded lanes 1, 2, and 3 of cable 1060 are mirrored in the cable 1050, and the cable 1060 is marked as either "bad" or "unused" in both directions (as shown by the large "X" 1084 in phantom) while cable 1050 is executing the entirety of communications between the first processing device 204-1 and the third processing device 204-3.

Therefore, in at least some embodiments, the link degrade for both nodes 1012 and 1032 do not necessarily have to be identical. As previously described, in at least some embodiments, the selection of the mirrored cable degrade mode 540 is used to determine the thresholds as used in the comparison determination steps 664 and 666 (see FIG. 6B).

The embodiments as disclosed and described herein are configured to provide an improvement to the technological field associated with multiprocessor computer systems and the intercommunications thereof. As such, the embodiments described herein integrate degrading the capability of one or more links between multiple processing devices, dynamically, with a multi-modality to facilitate uninterrupted service between the processing devices embedded within a multi-lane, multiprocessor computer systems.

The embodiments described herein facilitate the aforementioned integration into a practical application of a computer system, computer readable storage medium, and computer-implemented method for dynamically degrading links between multiple processing devices to facilitate uninterrupted service between the processing devices. Regardless of the status of the links with respect to the number of degraded and undegraded lanes, the embodiments described herein are configured to regulate the dynamic degrading and retraining of the affected lanes while maintaining the capability of one or more links between the multiple processing devices with a multi-modality to facilitate uninterrupted service between the processing devices embedded within multi-lane, multiprocessor computer systems.

More specifically, the embodiments described herein facilitate the computer-implemented method for dynamically degrading links between multiple processing devices to facilitate uninterrupted service between the processing devices. The embodiments herein eliminate the requirement for both nodes to independently indicate the degradation of the respective data communication lane(s) (a serial operation). In addition, at least a portion of the data communication lanes are degraded even though there may be no remaining spare lanes. Further, if a cable is degraded to the point of being removed from service, the other cable is sufficient to maintain proper communications between the respective drawers. Moreover, the embodiments disclosed herein facilitate tuning the combination of latencies in the communications circuits such that the resultant physical circuit configuration includes one or more degrade-capable links. Accordingly, any critical traffic, e.g., time-of-day (ToD) information that facilitates synchronizing the time across the two nodes, where lack of such temporal synchronization may jeopardize proper execution of the associated operations, is communicated through the respective communication links during the degrade/retrain period.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, computer readable storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of one or more transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 11:
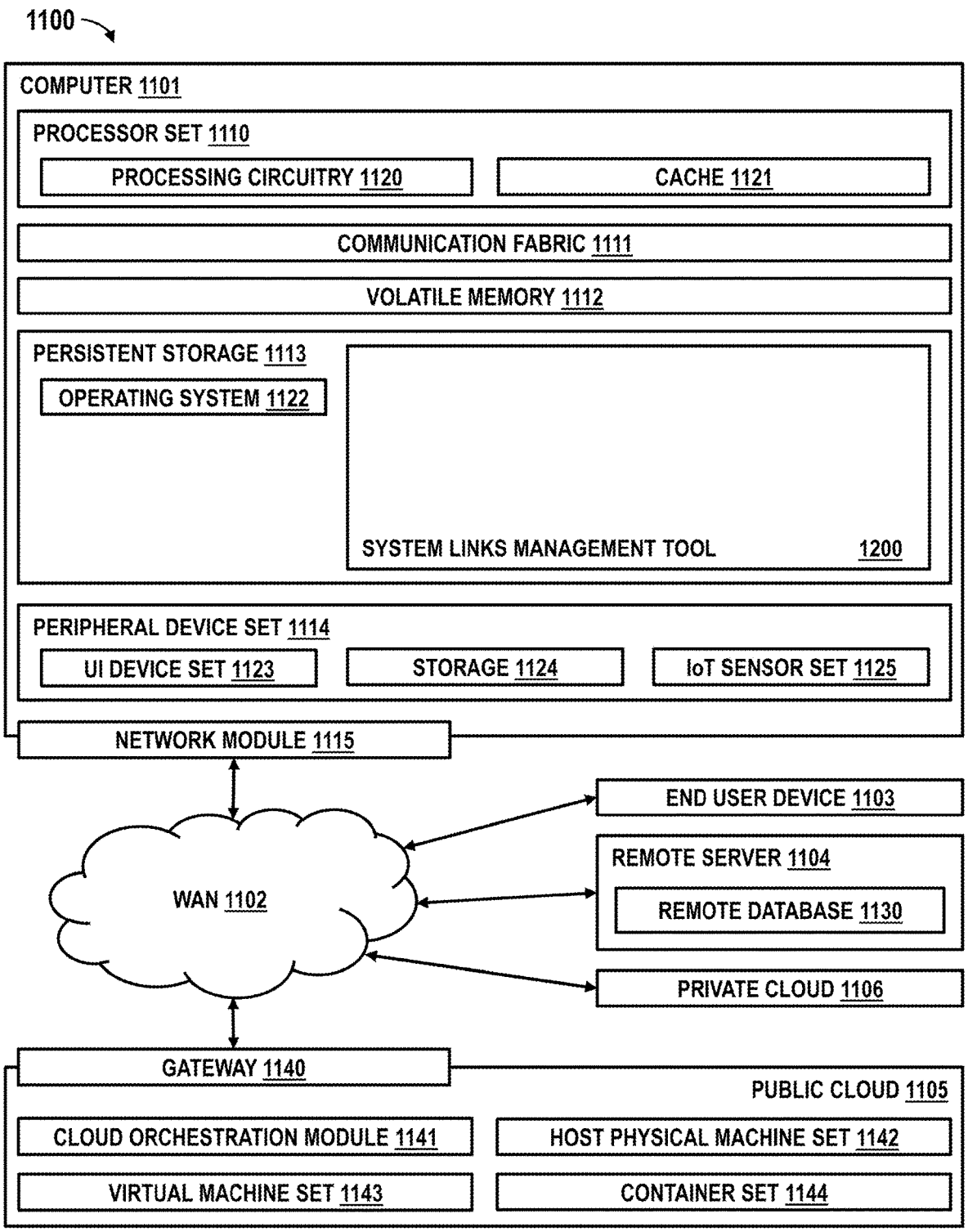
FIG. 11 is as block schematic diagram illustrating an example of a computing environment for the execution of at least some of the computer code involved in performing the disclosed methods described herein, in accordance with some embodiments of the present disclosure.

Referring to FIG. 11, a block schematic diagram is presented illustrating an example of a computing environment for the execution of at least some of the computer code involved in performing the disclosed methods described herein, in accordance with some embodiments of the present disclosure.

Computing environment 1100 contains an example of an environment for the execution of at least some of the computer code involved in performing the disclosed methods, such as systems link management tool 1200. In addition to block 1200, computing environment 1100 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 1200, as identified above), peripheral device set 1114 (including user interface (UI) device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

Computer 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud in FIG. 11. On the other hand, computer 1101 is not required to be in a cloud except to any extent as may be affirmatively indicated.

Processor set 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 1121 and the other storage media discussed below. The program instructions, and associated data, are accessed by processor set 1110 to control and direct performance of the disclosed methods. In computing environment 1100, at least some of the instructions for performing the disclosed methods may be stored in block 1200 in persistent storage 1113.

Communication fabric 1111 is the signal conduction path that allows the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 1112 is any type of volatile memory now known or to be developed in the future. Examples include dynamic type random access memory (RAM) or static type RAM. Typically, volatile memory 1112 is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

Persistent storage 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface-type operating systems that employ a kernel. The code included in block 1200 typically includes at least some of the computer code involved in performing the disclosed methods.

Peripheral device set 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

Network module 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the disclosed methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN 1102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

Remote server 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

Public cloud 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for dynamically degrading a link between multiple processing devices to facilitate uninterrupted service between the multiple processing devices comprising:
   a first node comprising a first plurality of processing devices;
   a second node comprising a second plurality of processing devices;
   a link communicatively coupling the first node to the second node, wherein the link comprises a plurality of lanes; and
   a link retrain control module operably coupled to the link, the link retrain control module configured to:
      determine a number of undegraded lanes of the plurality of lanes within the link;
      determine, subject to the number of undegraded lanes of the plurality of lanes, a first operational degrade mode for the link;
      initiate a retrain of the link to a second operational degrade mode; and
      dynamically, subject to the first degrade mode of operation, determine one or more message packet types to transmit through the link during the link retrain by executing a majority voting scheme, thereby facilitating uninterrupted service between the multiple processing devices, wherein executing the majority voting scheme comprises:
         collecting lane-related inputs directed toward the message packet type of the one or more message packet types for all of the undegraded lanes of the plurality of lanes of the link;
         determining that the link retrain is not in progress;
         determining, subject to the link retrain not in progress, the message packet type comprising:
            analyzing the collected lane-related inputs together, where a requested message packet type receives one vote per lane; and
            determining the message packet type that received more votes than any other message packet type; and
         receiving, for the message packet type with the most votes, a temporal priority for transmission through the link.

2. The system of claim 1, the link retrain control module further configured to:
   select critical message packet types.

3. The system of claim 1, wherein the link includes a plurality of cables, each cable of the plurality of cables comprises at least a portion of the plurality of lanes, the link retrain control module further configured to:
   dynamically, as a function of the link retrain in progress, shift a majority voting scheme from analyzing all of the collected lane-related inputs together to analyzing the collected lane-related inputs on a per-cable basis.

4. The system of claim 3, the link retrain control module further configured to:
   execute a threshold analysis on the collected lane-related inputs comprising:
      summing a number of undegraded collected lane-related inputs separately for each cable of the plurality of cables;
      comparing the sum for each respective cable of the plurality of cables to a threshold value for that cable; and
      determining, subject to the comparing, for each cable of the plurality of cables, one selected from a group consisting of:
         further voting analysis of the collected lane-related inputs; and
         no further voting analysis of the collected lane-related inputs; and
      combining results of the per-cable voting analyses.

5. The system of claim 4, the link retrain control module further configured to:
   adjust, subject to the second operational degrade mode, the respective threshold value for one or more cables of the plurality of cables.

6. A computer readable storage medium having computer executable instructions that when executed by at least one computing device dynamically degrade a link between multiple processing devices to facilitate uninterrupted service between the multiple processing devices, comprising instructions to:
   determine a number of undegraded lanes within the link;
   determine, subject to the number of undegraded lanes, a first operational degrade mode for the link;
   initiate a retrain of the link to a second operational degrade mode; and
   dynamically, subject to the first degrade mode of operation, determine one or more message packet types to transmit through the link during the link retrain by executing a majority voting scheme, thereby facilitating uninterrupted service between the multiple processing devices, wherein executing the majority voting scheme comprises:
      collecting lane-related inputs directed toward the message packet type of the one or more message packet types for all of the undegraded lanes of the link;
      determining that the link retrain is not in progress;
      determining, subject to the link retrain not in progress, the message packet type through:
         analyzing the collected lane-related inputs together, where a requested message packet type receives one vote per lane; and
         determining the message packet type with the most votes; and
      receive, for the message packet type that received more votes than any other message packet type, a temporal priority for transmission through the link.

7. The computer readable storage medium of claim 6, further comprising instructions to:
select critical message packet types.

8. The computer readable storage medium of claim 6, wherein the link includes a plurality of cables, further comprising instructions to:
dynamically, as a function of the link retrain in progress, shift a majority voting scheme from analyzing all of the collected lane-related inputs together to analyzing the collected lane-related inputs on a per-cable basis.

9. The computer readable storage medium of claim 8, further comprising instructions to:
execute a threshold analysis on the collected lane-related inputs comprising instructions to:
sum a number of undegraded collected lane-related inputs separately for each cable;
compare the sum for each respective cable to a threshold value for that cable; and
determine, subject to the comparing, for each cable, one selected from a group consisting of:
further voting analysis of the collected lane-related inputs; and
no further voting analysis of the collected lane-related inputs;
combine results of the per-cable voting analyses; and
adjust, subject to the second operational degrade mode, the respective threshold value for one or more cables of the plurality of cables.

10. A computer-implemented method for dynamically degrading a link between multiple processing devices to facilitate uninterrupted service between the multiple processing devices comprising:
determining a number of undegraded lanes within the link;
determining, subject to the number of undegraded lanes, a first operational degrade mode for the link;
initiating a retrain of the link to a second operational degrade mode; and
dynamically, subject to the first degrade mode of operation, determining one or more message packet types to transmit through the link during the link retrain by executing a majority voting scheme, thereby facilitating uninterrupted service between the multiple processing devices, wherein the executing a majority voting scheme comprises:
collecting lane-related inputs directed toward the message packet type of the one or more message packet types for all of the undegraded lanes of the link;
determining that the link retrain is not in progress;
determining, subject to the link retrain not in progress, the message packet type through:
analyzing of the collected lane-related inputs together, where a requested message packet type receives one vote per lane;
determining the message packet type with the most votes; and
receiving, for the message packet type that received more votes than any other message packet type, a temporal priority for transmission through the link.

11. The method of claim 10, wherein the dynamically determining one or more message packet types to transmit through the link during the link retrain comprises:
selecting critical message packet types.

12. The method of claim 10, wherein the link includes a plurality of cables, further comprising:
dynamically, as a function of the link retrain in progress, shifting a majority voting scheme from analyzing all of the collected lane-related inputs together to analyzing the collected lane-related inputs on a per-cable basis.

13. The method of claim 12, further comprising:
executing a threshold analysis on the collected lane-related inputs comprising:
summing a number of undegraded collected lane-related inputs separately for each cable;
comparing the sum for each respective cable to a threshold value for that cable; and
determining, subject to the comparing, for each cable, one selected from a group consisting of:
further voting analysis of the collected lane-related inputs; and
no further voting analysis of the collected lane-related inputs; and
combining results of the per-cable voting analyses.

14. The method of claim 13, further comprising:
adjusting, subject to the second operational degrade mode, the respective threshold value for one or more cables of the plurality of cables.

* * * * *